United States Patent
Kuwashiro

(10) Patent No.: US 10,330,901 B2
(45) Date of Patent: Jun. 25, 2019

(54) ZOOM LENS, IMAGE PICKUP APPARATUS HAVING THE ZOOM LENS AND IMAGE PICKUP SYSTEM HAVING THE ZOOM LENS

(71) Applicant: CANON KABUSHIKI KAISHA, Tokyo (JP)

(72) Inventor: Shin Kuwashiro, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/804,323

(22) Filed: Nov. 6, 2017

(65) Prior Publication Data
US 2018/0129025 A1    May 10, 2018

(30) Foreign Application Priority Data
Nov. 7, 2016 (JP) ................... 2016-216986

(51) Int. Cl.
G02B 15/177 (2006.01)
G02B 15/20 (2006.01)

(52) U.S. Cl.
CPC ........... *G02B 15/177* (2013.01); *G02B 15/20* (2013.01)

(58) Field of Classification Search
CPC ....... G02B 15/177; G02B 15/20; G02B 15/14
USPC ........................ 359/676, 684, 689
See application file for complete search history.

(56) References Cited

U.S. PATENT DOCUMENTS

| 2012/0307372 A1* | 12/2012 | Ichikawa | G02B 15/177 |
| | | | 359/680 |
| 2012/0327276 A1 | 12/2012 | Ono et al. | |
| 2017/0139190 A1 | 5/2017 | Kuwashiro | |
| 2017/0293123 A1 | 10/2017 | Kuwashiro et al. | |

FOREIGN PATENT DOCUMENTS

| JP | 2006-113572 A | 4/2006 |
| JP | 2010-160275 A | 7/2010 |
| JP | 2010-160277 A | 7/2010 |

OTHER PUBLICATIONS

Gross et al., "Handbook of Optical Systems, vol. 3: Aberration Theory and Correction of Optical Systems," Wiley-VCH Verlag GmbH & Co. KGaA, Weinheim, DE, pp. 377-379, Jan. 1, 2007.
European Search Report dated Mar. 8, 2018 in corresponding European Patent Application No. 17197320.9, 10 pages.

* cited by examiner

*Primary Examiner* — James R Greece
(74) *Attorney, Agent, or Firm* — Carter, DeLuca & Farrell LLP

(57) ABSTRACT

The zoom lens according to the present invention includes, in order from an object side to an image side, a negative first lens unit, an aperture stop, a positive second lens unit, and a positive rear lens group. The rear lens group includes a negative lens unit LN and a positive lens unit LP. During zooming, the first lens unit does not move, the second lens unit moves so as to be closer to object side at a telephoto end (TE) than at a wide-angle end (WE), the lens unit LP moves so as to be closer to image side at TE than at WE, and an interval between every adjacent two of lens units changes. Focal lengths of second lens unit and lens unit LP, and an amount by which each of second lens unit and lens unit LP moves for zooming from WE to TE are appropriately set.

15 Claims, 11 Drawing Sheets

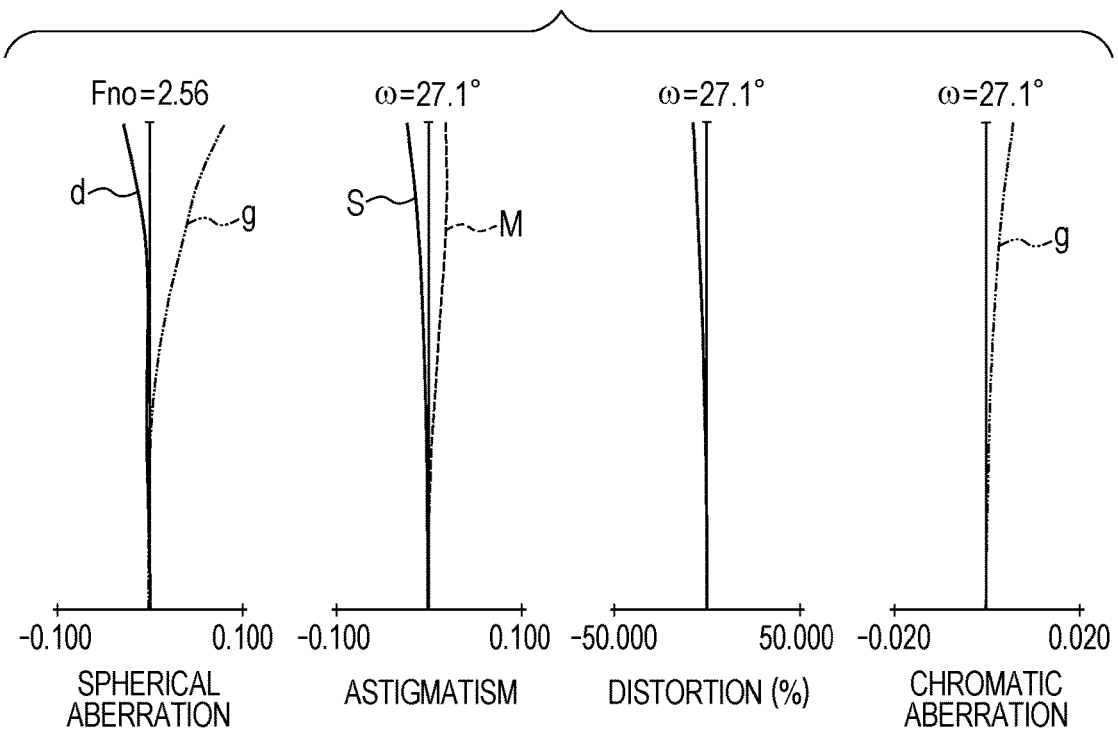
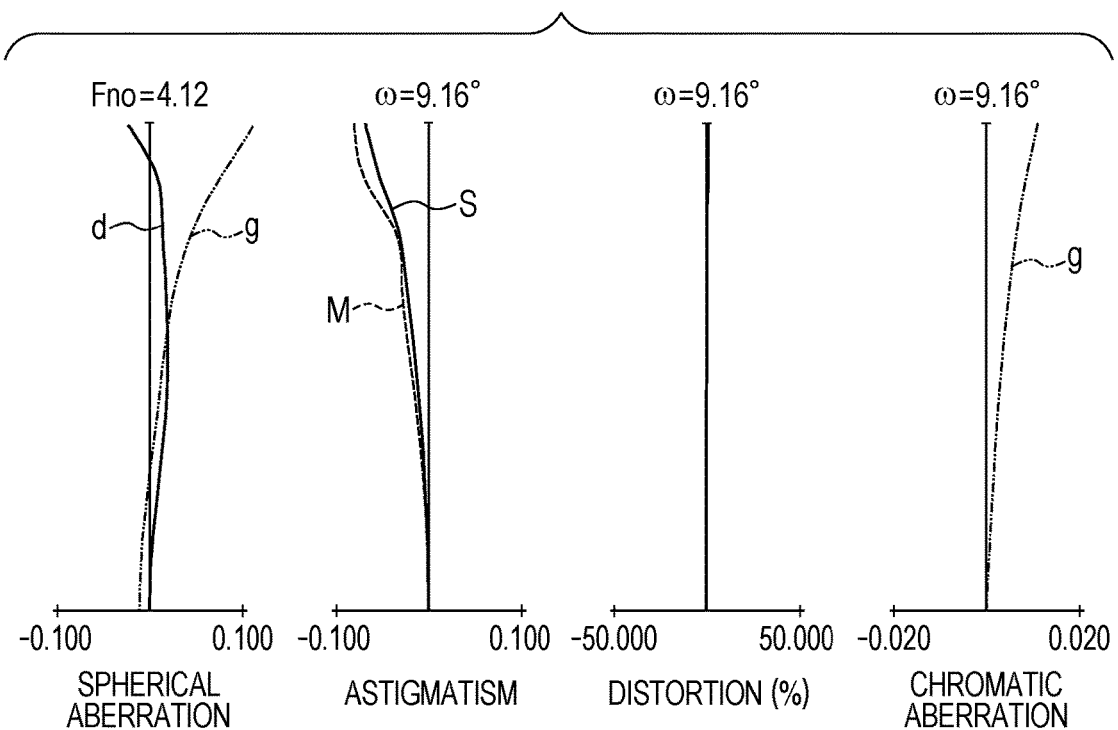

ZOOM LENS, IMAGE PICKUP APPARATUS HAVING THE ZOOM LENS AND IMAGE PICKUP SYSTEM HAVING THE ZOOM LENS

BACKGROUND OF THE INVENTION

Field of the Invention

The present invention relates to a zoom lens, and is particularly advantageous when applied to an image pickup optical system for use in an image pickup apparatus and an image pickup system, such as a surveillance camera, a digital camera, a video camera, or a broadcasting camera.

Description of the Related Art

It is demanded that an image pickup optical system for use in an image pickup apparatus using an image pickup element be a zoom lens that offers high optical performance with a wide angle of view to enable easy image capturing of a wide area. From the viewpoint of achieving high image quality, for example, one of the demands to be met by a zoom lens is to satisfy 4K resolution to be able to sufficiently support an image pickup element with pixels of full high definition (HD) or higher image quality.

It is also demanded that a zoom lens for use in a surveillance camera have a high zoom ratio and be so small in overall size as to be installable anywhere. As a zoom lens that satisfies these demands, there has been known a negative lead type zoom lens, in which a lens unit having a negative refractive power is disposed closest to the object side (Japanese Patent Application Laid-Open No. 2010-160275 and Japanese Patent Application Laid-Open No. 2006-113572).

Japanese Patent Application Laid-Open No. 2010-160275 and Japanese Patent Application Laid-Open No. 2006-113572 each disclose a zoom lens which includes, in order from the object side to the image side, a first lens unit to a fourth lens unit respectively having negative, positive, negative, and positive refractive powers, and which performs zooming by changing the distance between every adjacent two of the lens units, whereas the first lens unit does not move during zooming. Specifically, Japanese Patent Application Laid-Open No. 2010-160275 discloses a zoom lens with an angle of view of approximately 81° at the wide-angle end for an image pickup and a zoom ratio on the order of 6×. Japanese Patent Application Laid-Open No. 2006-113572 discloses a zoom lens with an angle of view of approximately 76° at the wide-angle end for an image pickup and a zoom ratio on the order of 3×.

It is easier to widen an angle of view for a negative lead type zoom lens than for a positive lead type zoom lens. However, widening the angle of view tends to increase the effective diameter of the front lens (the first lens unit), consequently increasing the overall size of the zoom lens. Thus, in order to obtain a wide angle of view without increasing the overall size of the zoom lens, it is important to appropriately set the lens configuration of each lens unit, or the first lens unit in particular. Further, appropriate setting of the refractive powers, the movement amounts during zooming, and the like for the lens units is important in obtaining a high zoom ratio without increasing the overall size of the zoom lens.

Unless these configurations are not appropriately set, it is difficult to obtain a zoom lens that offers high optical performance with a small overall size, a high zoom ratio, a wide angle of view, and favorable correction of various aberrations. Further, to have a resolution four times as high as full HD, the number of pixels of an image pickup element needs to be four times as many as that for full HD. However, quadrupling the number of pixels without changing the diagonal length of the image pickup element reduces the size of each pixel to a quarter of its original size, and this decreases the optical performance in low light conditions, which is important for a surveillance camera for example.

It is therefore important to quadruple the number of pixels without changing the pixel size, and to this end, the diagonal length of the image pickup apparatus is doubled approximately. Increasing the diagonal length of the image pickup element proportionally increases the size, and in turn the weight, of the lens system. Then, a larger motor is needed to drive the lens units during zooming, or the driving speed slows down. It is therefore desired that a zoom lens for use in a surveillance camera or the like be so configured as to offer favorable optical properties with a wide angle of view and a high zoom ratio, without having to drive a heavy lens unit during zooming.

SUMMARY OF THE INVENTION

The present invention aims to provide a zoom lens which has a small overall size, a wide angle of view, and a high zoom ratio and offers high optical performance over the entire zoom range. The present invention also aims to provide an image pickup apparatus and an image pickup system having such a zoom lens.

The zoom lens according to the present invention includes, in order from an object side to an image side, a first lens unit having a negative refractive power, an aperture stop, a second lens unit having a positive refractive power, and a rear lens group having a positive refractive power. The rear lens group includes a lens unit LN having a negative refractive power and a lens unit LP having a positive refractive power. During zooming, the first lens unit does not move, the second lens unit moves so as to be closer to the object side at a telephoto end than at a wide-angle end, the lens unit LP moves so as to be closer to the image side at the telephoto end than at the wide-angle end, and an interval between every adjacent two of the lens units changes. The zoom lens satisfies the following conditional expressions:

$$1.1 < |M2|/f2 < 3.0, \text{ and}$$

$$0.15 < |Mp|/fp < 0.50$$

where f2 is a focal length of the second lens unit, fp is a focal length of the lens unit LP, M2 is an amount by which the second lens unit moves for zooming from the wide-angle end to the telephoto end, and Mp is an amount by which the lens unit LP moves for zooming from the wide-angle end to the telephoto end.

Further features of the present invention will become apparent from the following description of exemplary embodiments with reference to the attached drawings.

BRIEF DESCRIPTION OF THE DRAWINGS

FIG. 2B is an aberration diagram of the zoom lens of Embodiment 1 at an intermediate zoom position.

FIG. 2C is an aberration diagram of the zoom lens of Embodiment 1 at the telephoto end.

DESCRIPTION OF THE EMBODIMENTS

Preferred embodiments of the present invention will now be described in detail in accordance with the accompanying drawings. Zoom lenses of the present embodiments each include, in order from an object side to an image side, a first lens unit having a negative refractive power, a second lens unit having a positive refractive power, and a rear lens group which includes a lens unit LN having a negative refractive power and a lens unit LP having a positive refractive power and has a positive refractive power overall.

During zooming, the first lens unit does not move, the second lens unit moves to be closer to the object side at the telephoto end than at the wide-angle end, and the lens unit LP moves closer to the image side at the telephoto end than at the wide-angle end. An interval between every adjacent two of the lens units changes during zooming. The zoom lens has an aperture stop between the first lens unit and the second lens unit. The rear lens group includes, in order from the object side to the image side, a third lens unit having a negative refractive power and a fourth lens unit having a positive refractive power. Alternatively, the rear lens group includes, in order from the object side to the image side, a third lens unit having a negative refractive power, a fourth lens unit having a positive refractive power, and a fifth lens unit having a positive refractive power.

Figure 1:
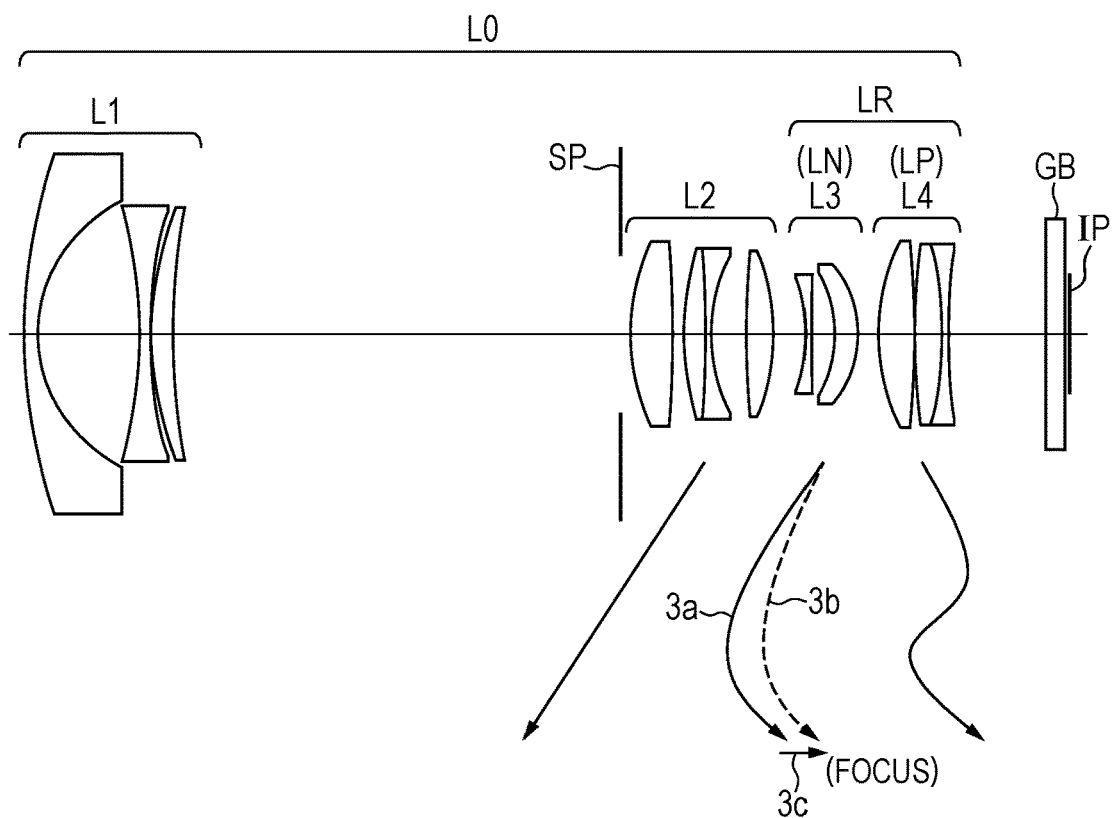
FIG. 1 is a lens sectional diagram of a zoom lens of Embodiment 1 at the wide-angle end.
Figure 2A:
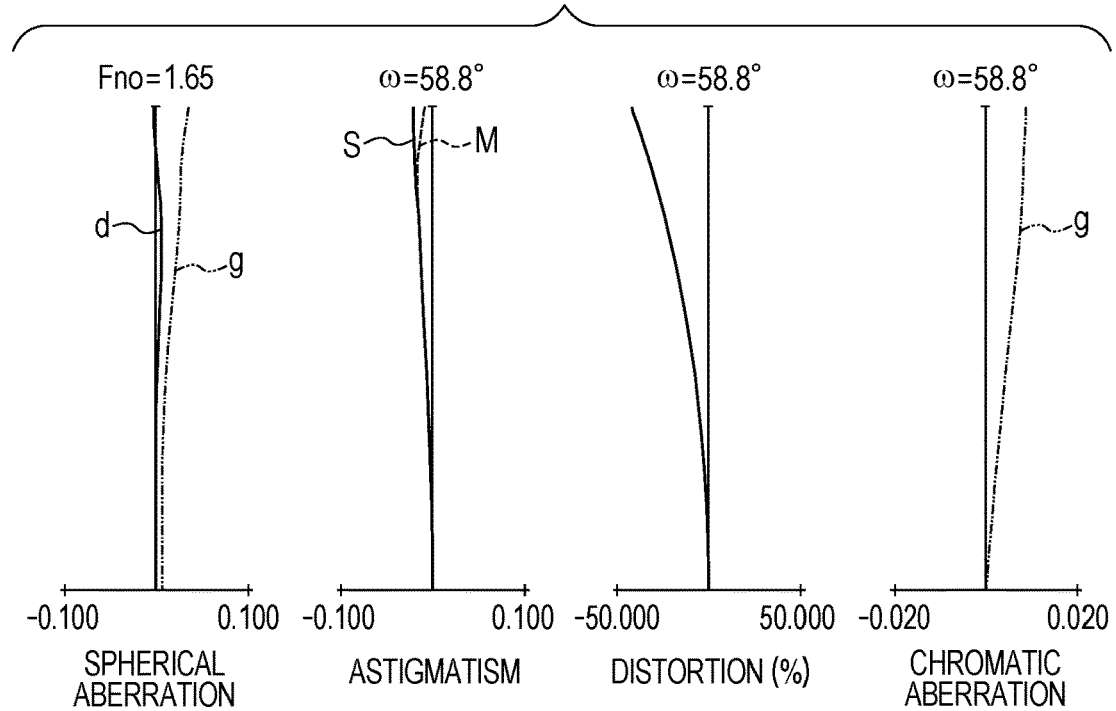
FIG. 2A is an aberration diagram of the zoom lens of Embodiment 1 at the wide-angle end.

FIG. 1 is a lens sectional diagram of a zoom lens of Embodiment 1 of the present invention at the wide-angle end (shortest focal length). FIGS. 2A, 2B, and 2C are aberration diagrams of the zoom lens of Embodiment 1 at the wide-angle end, an intermediate zoom position, and the telephoto end (longest focal length), respectively. The zoom lens of Embodiment 1 has a zoom ratio of 5.89 and an f-number of 1.65 to 4.12.

Figure 3:
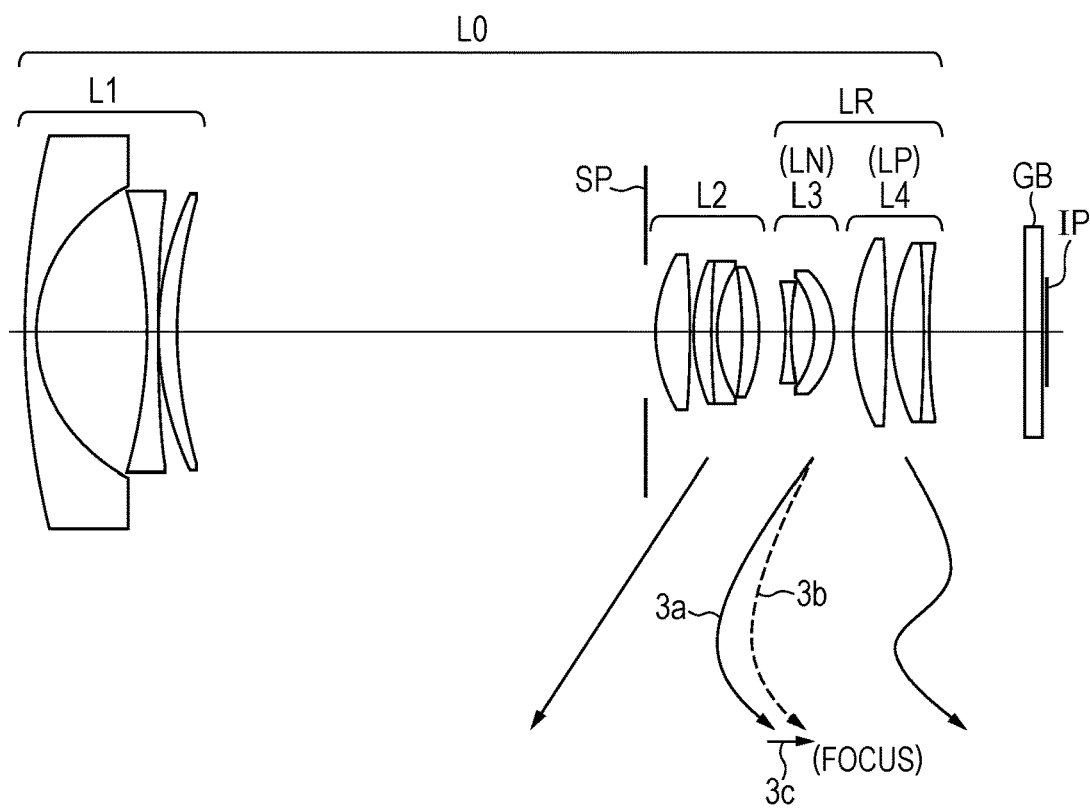
FIG. 3 is a lens sectional diagram of a zoom lens of Embodiment 2 at the wide-angle end.
Figure 4A:
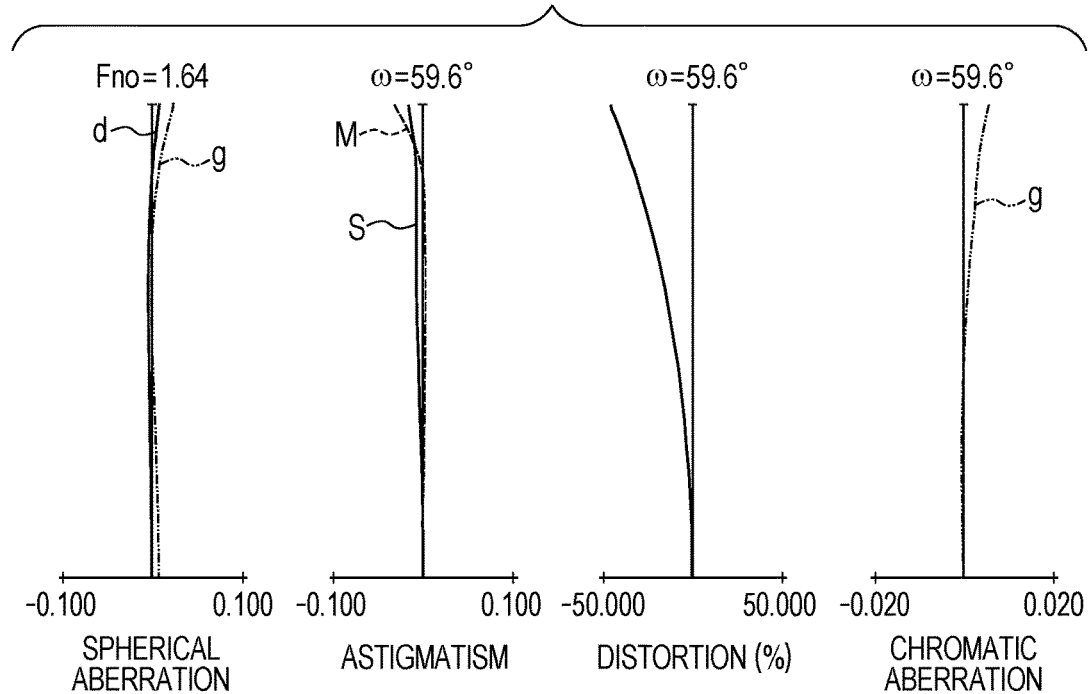
FIG. 4A is an aberration diagram of the zoom lens of Embodiment 2 at the wide-angle end.
Figure 4B:
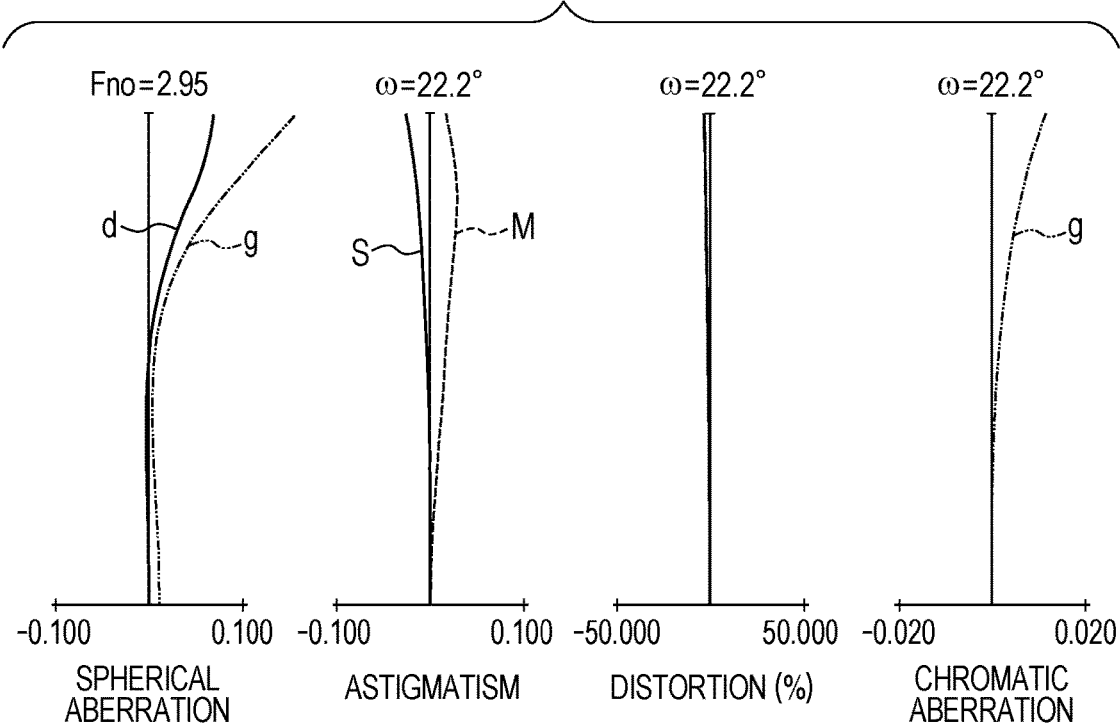
FIG. 4B is an aberration diagram of the zoom lens of Embodiment 2 at the intermediate zoom position.
Figure 4C:
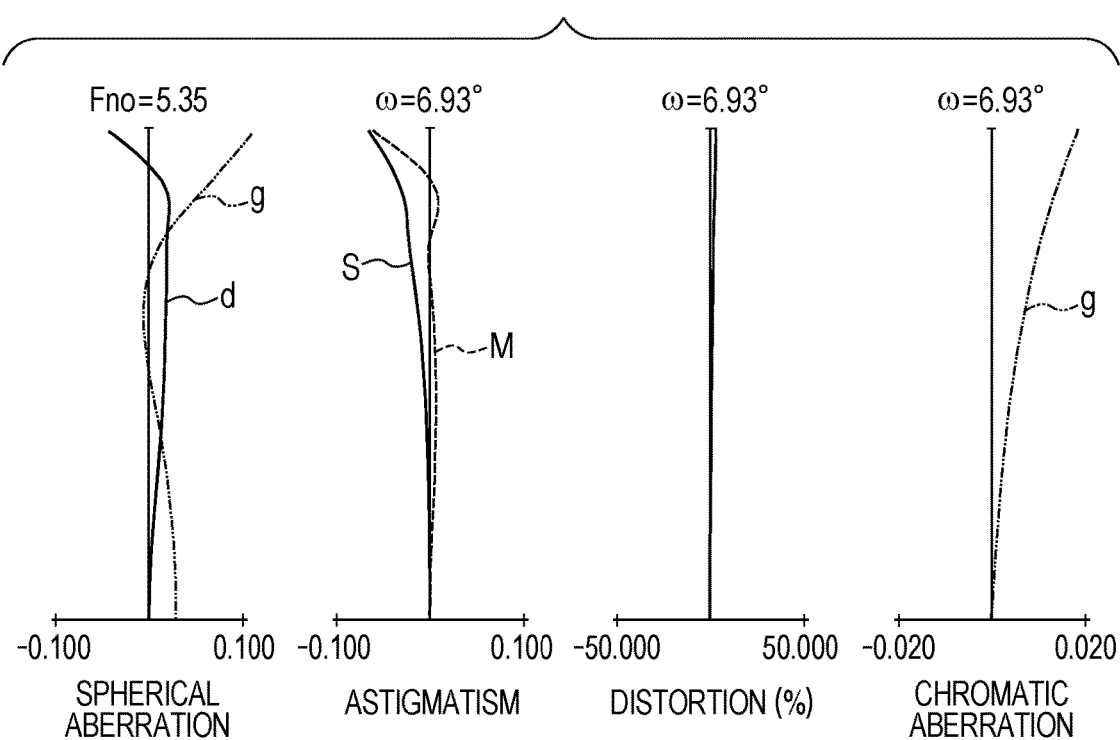
FIG. 4C is an aberration diagram of the zoom lens of Embodiment 2 at the telephoto end.

FIG. 3 is a lens sectional diagram of a zoom lens of Embodiment 2 of the present invention at the wide-angle end. FIGS. 4A, 4B, and 4C are aberration diagrams of the zoom lens of Embodiment 2 at the wide-angle end, an intermediate zoom position, and the telephoto end, respectively. The zoom lens of Embodiment 2 has a zoom ratio of 7.39 and an f-number of 1.64 to 5.35.

Figure 5:
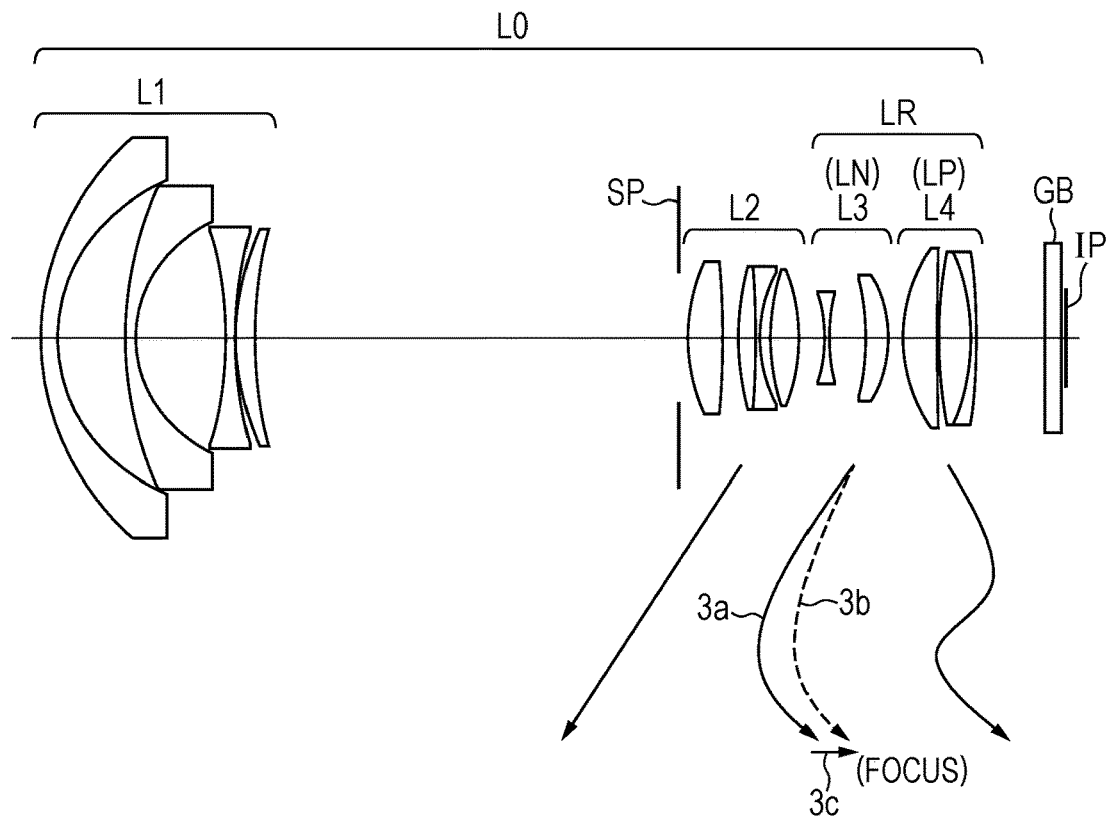
FIG. 5 is a lens sectional diagram of a zoom lens of Embodiment 3 at the wide-angle end.
Figure 6A:
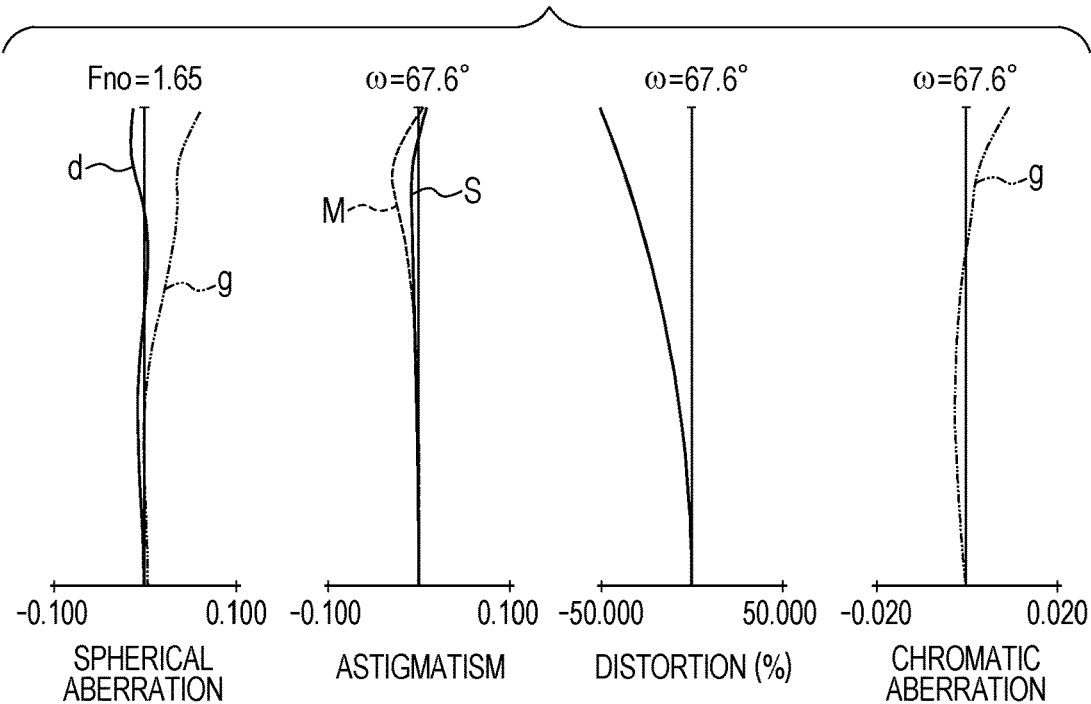
FIG. 6A is an aberration diagram of the zoom lens of Embodiment 3 at the wide-angle end.
Figure 6B:
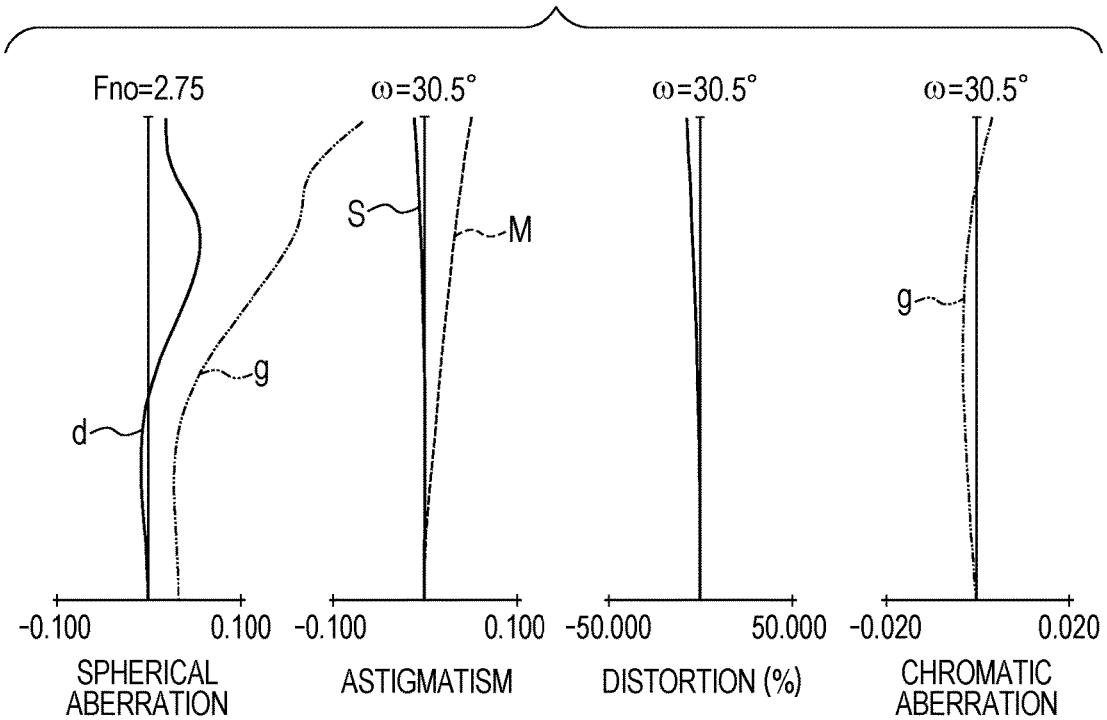
FIG. 6B is an aberration diagram of the zoom lens of Embodiment 3 at the intermediate zoom position.
Figure 6C:
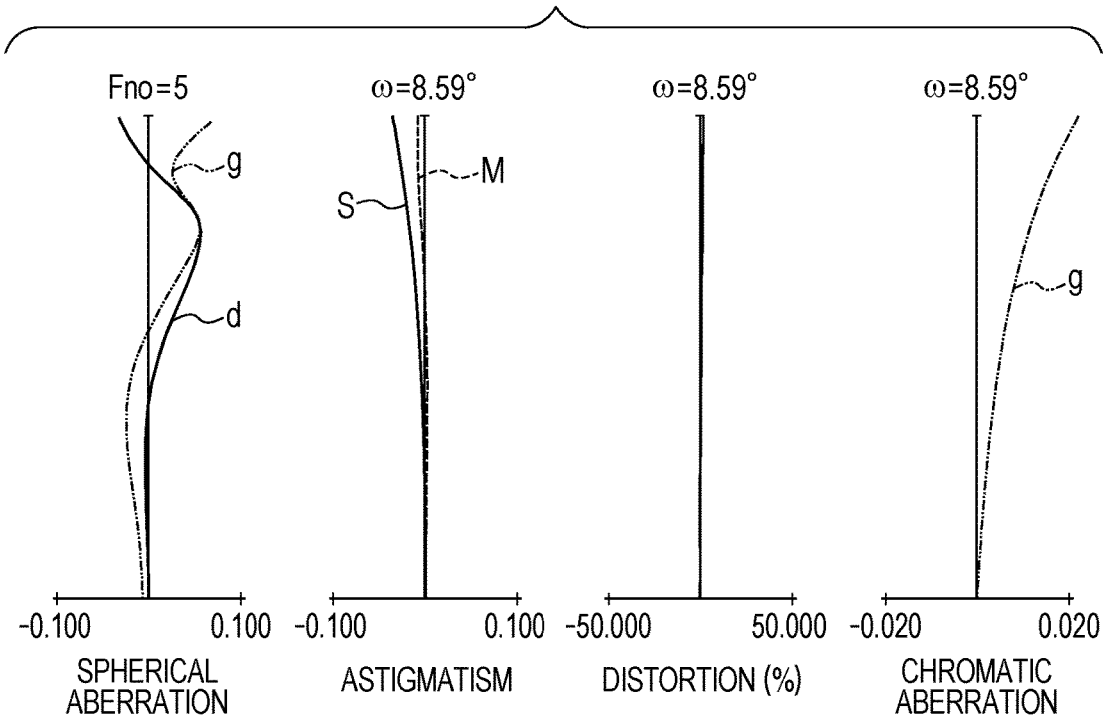
FIG. 6C is an aberration diagram of the zoom lens of Embodiment 3 at the telephoto end.

FIG. 5 is a lens sectional diagram of a zoom lens of Embodiment 3 of the present invention at the wide-angle end. FIGS. 6A, 6B, and 6C are aberration diagrams of the zoom lens of Embodiment 3 at the wide-angle end, an intermediate zoom position, and the telephoto end, respectively. The zoom lens of Embodiment 3 has a zoom ratio of 7.89 and an f-number of 1.65 to 5.00.

Figure 7:
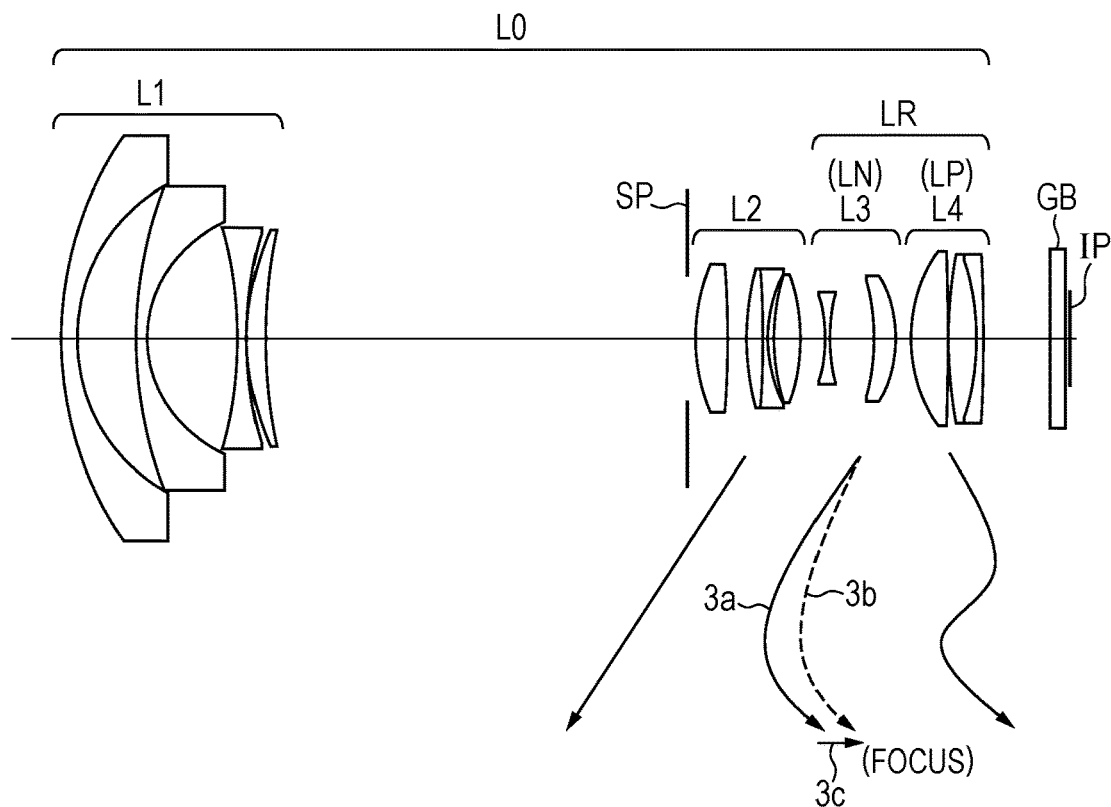
FIG. 7 is a lens sectional diagram of a zoom lens of Embodiment 4 at the wide-angle end.
Figure 8A:
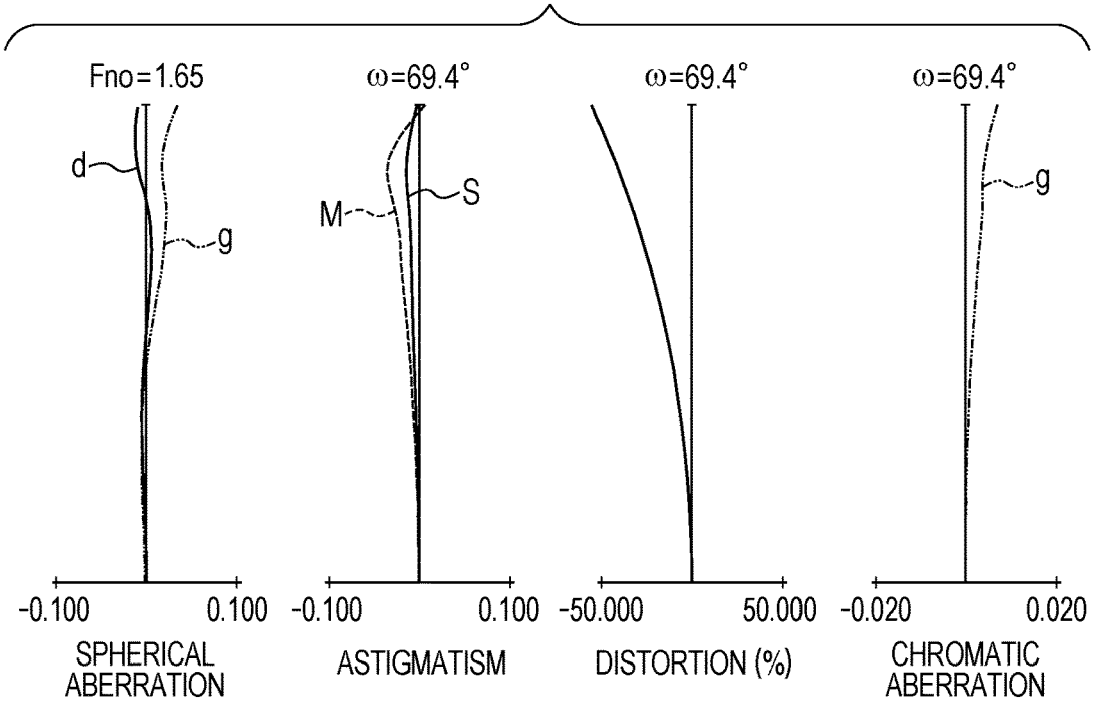
FIG. 8A is an aberration diagram of the zoom lens of Embodiment 4 at the wide-angle end.
Figure 8B:
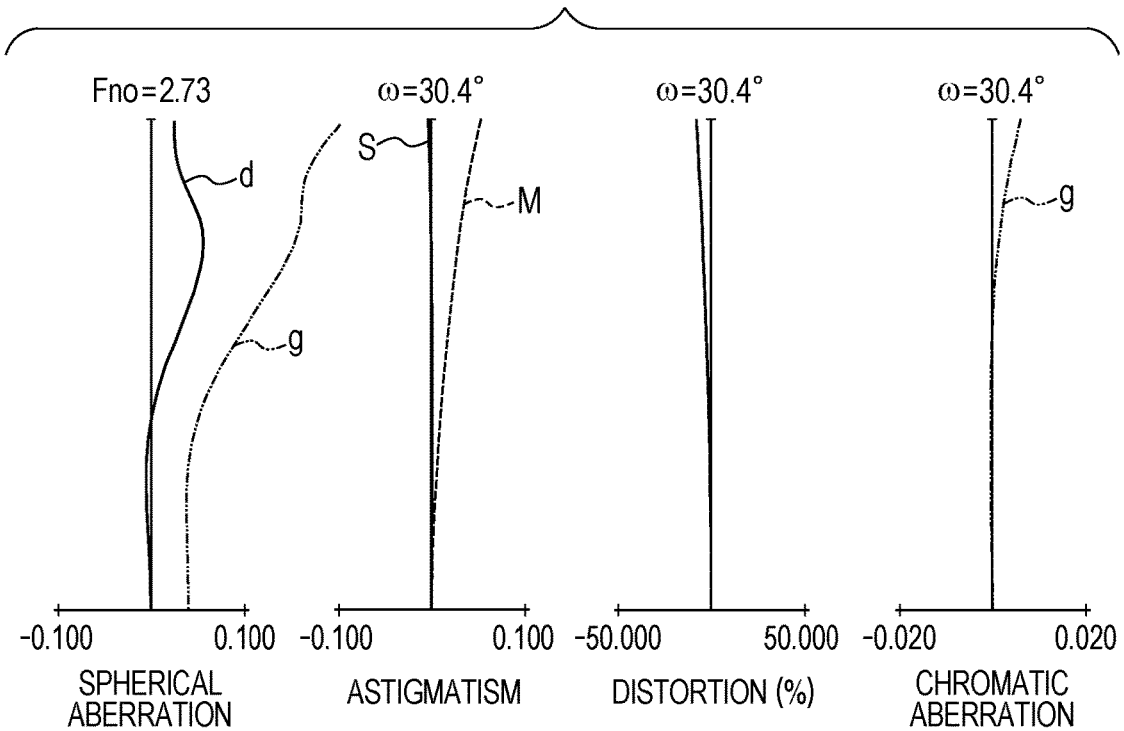
FIG. 8B is an aberration diagram of the zoom lens of Embodiment 4 at the intermediate zoom position.
Figure 8C:
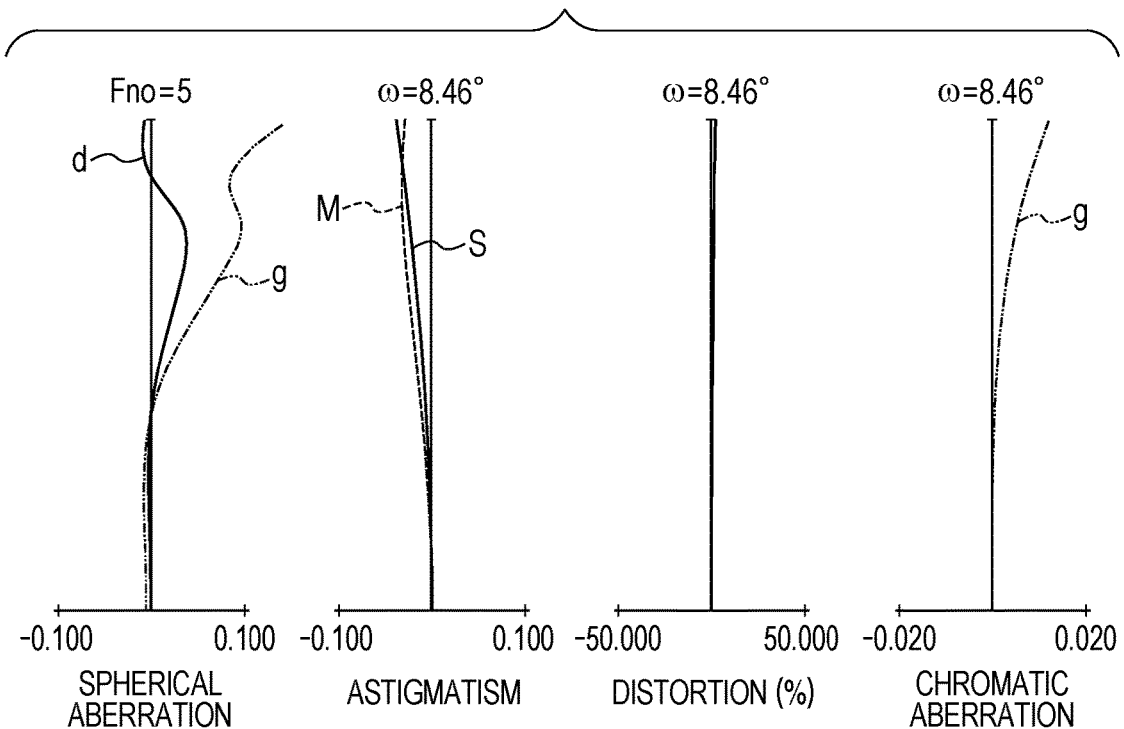
FIG. 8C is an aberration diagram of the zoom lens of Embodiment 4 at the telephoto end.

FIG. 7 is a lens sectional diagram of a zoom lens of Embodiment 4 of the present invention at the wide-angle end. FIGS. 8A, 8B, and 8C are aberration diagrams of the zoom lens of Embodiment 4 at the wide-angle end, an intermediate zoom position, and the telephoto end, respectively. The zoom lens of Embodiment 4 has a zoom ratio of 7.89 and an f-number of 1.65 to 5.00.

Figure 9:
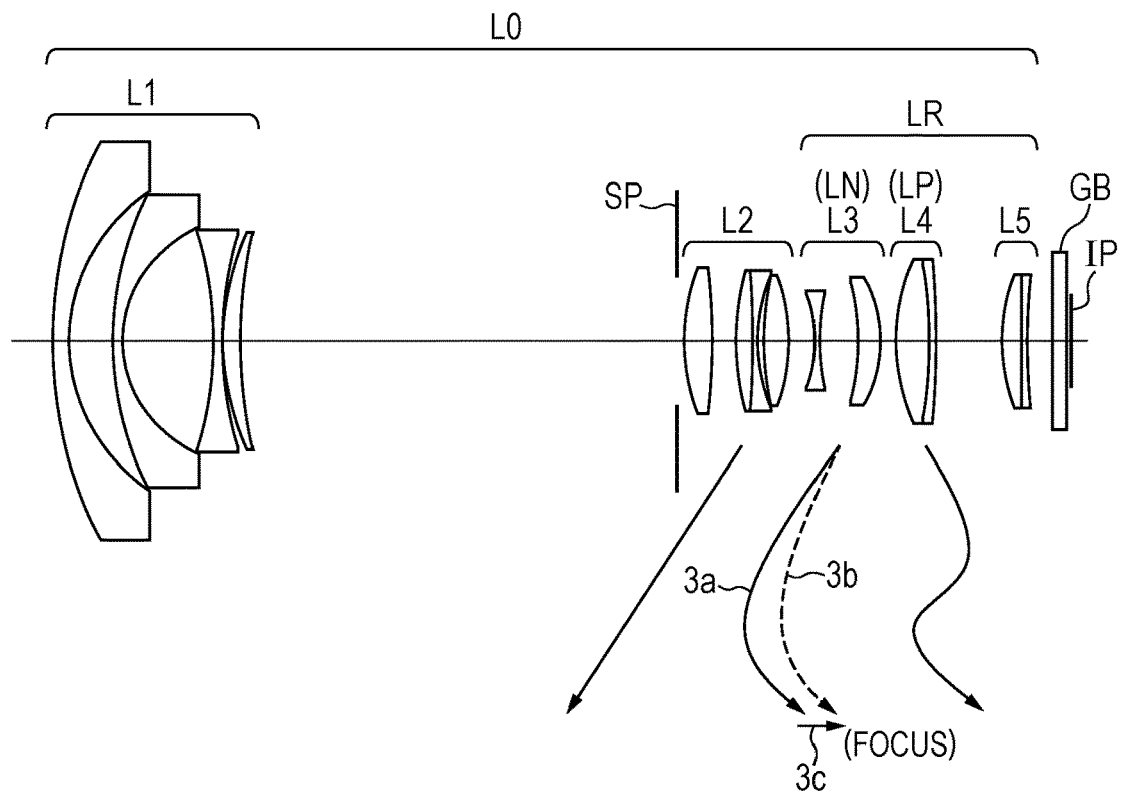
FIG. 9 is a lens sectional diagram of a zoom lens of Embodiment 5 at the wide-angle end.
Figure 10A:
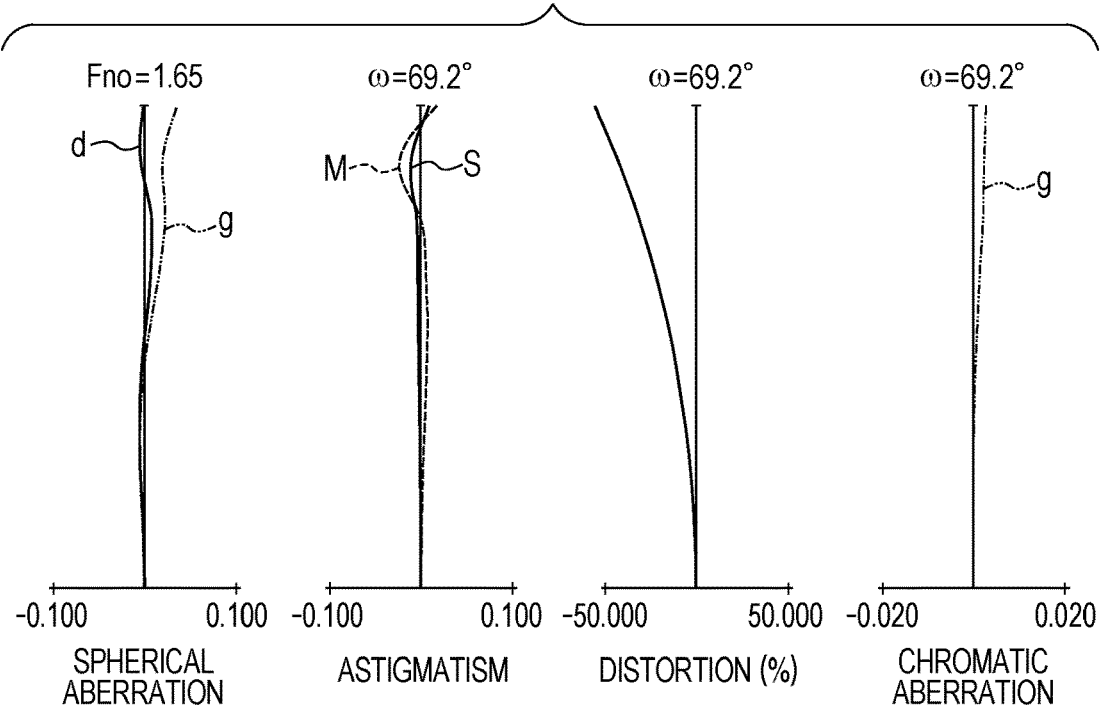
FIG. 10A is an aberration diagram of the zoom lens of Embodiment 5 at the wide-angle end.
Figure 10B:
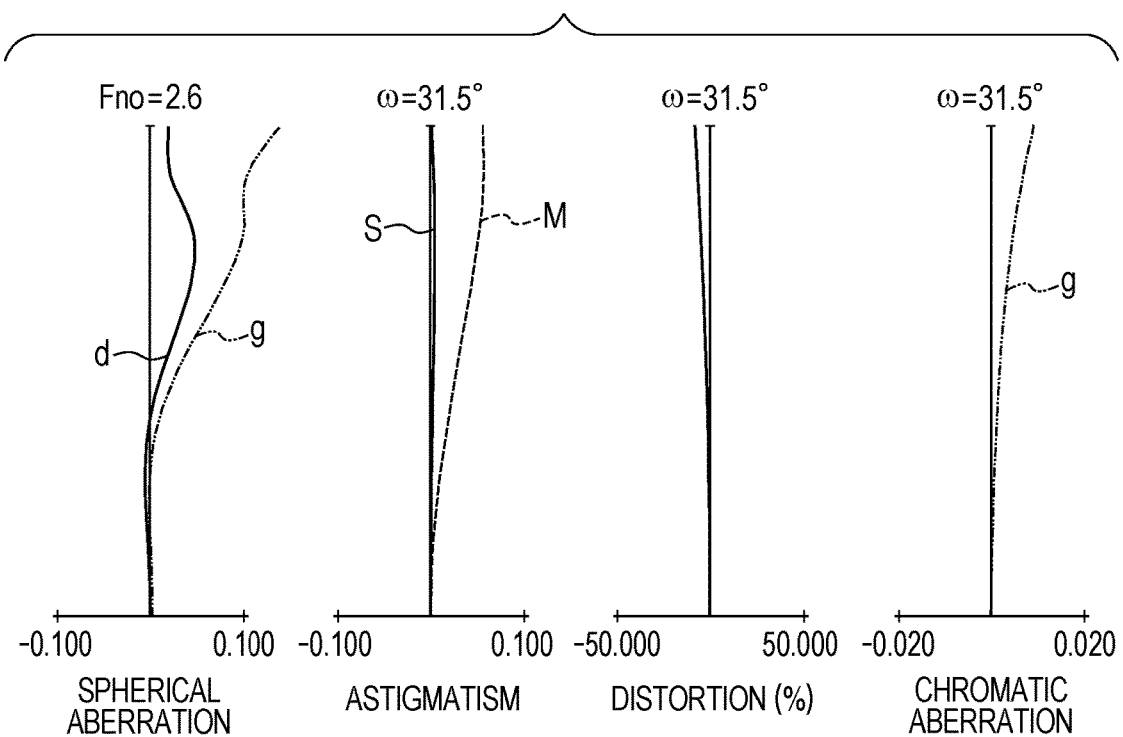
FIG. 10B is an aberration diagram of the zoom lens of Embodiment 5 at the intermediate zoom position.
Figure 10C:
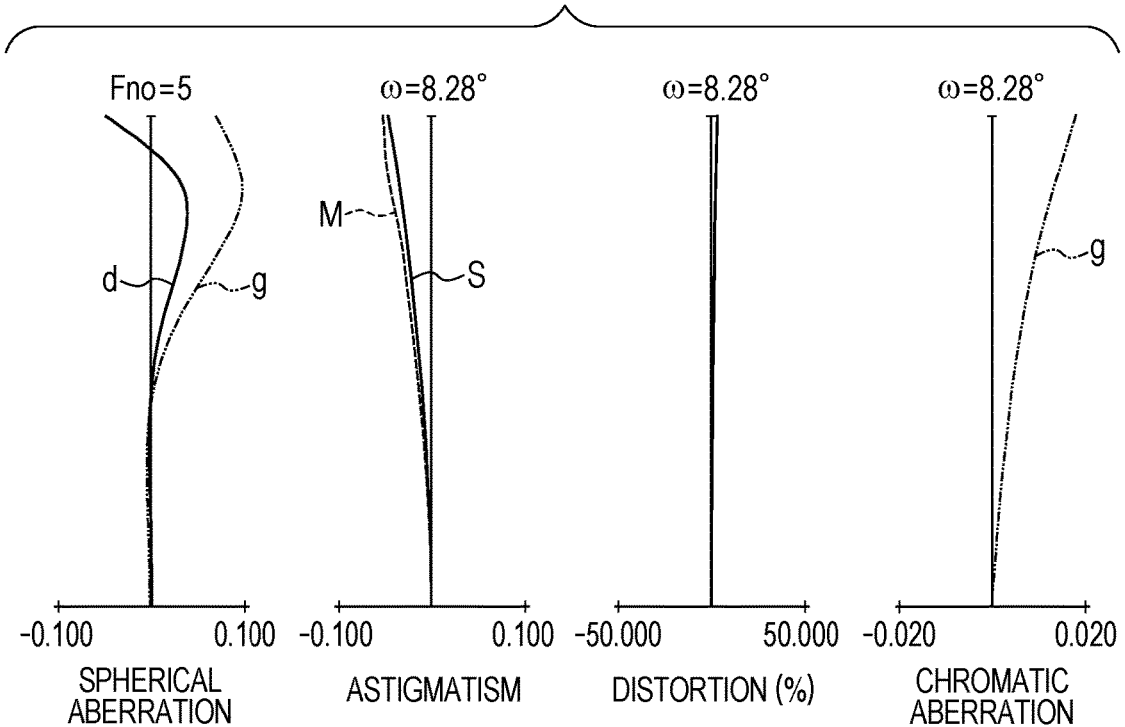
FIG. 10C is an aberration diagram of the zoom lens of Embodiment 5 at the telephoto end.
Figure 11:
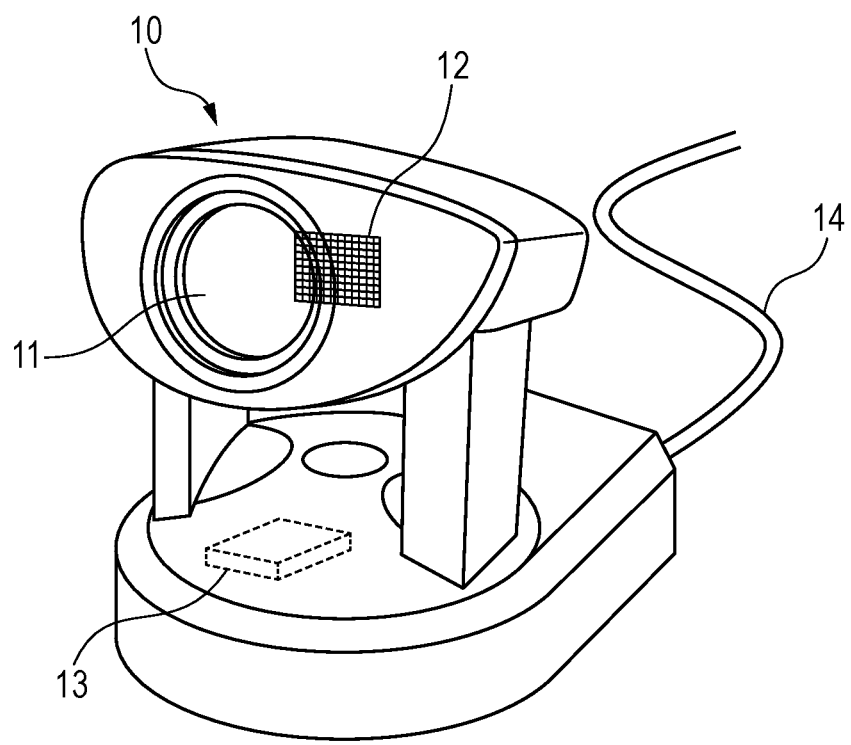
FIG. 11 is a diagram schematically illustrating the main part of an image pickup apparatus of the present invention.

FIG. 9 is a lens sectional diagram of a zoom lens of Embodiment 5 of the present invention at the wide-angle end. FIGS. 10A, 10B, and 10C are aberration diagrams of the zoom lens of Embodiment 5 at the wide-angle end, an intermediate zoom position, and the telephoto end, respectively. The zoom lens of Embodiment 5 has a zoom ratio of 7.89 and an f-number of 1.65 to 5.00. FIG. 11 is a diagram schematically illustrating the main part of an image pickup apparatus of the present invention.

The zoom lens of each embodiment is an image pickup optical system for use in a surveillance camera. The zoom lens of each embodiment may also be used in an image pickup apparatus such as a video camera, a digital camera, a silver-halide film camera, or a television camera.

In each lens sectional diagram, the left side is the object side (front), and the right side is the image side (rear). Further, "L0" in each lens sectional diagram denotes a zoom lens. "LR" denotes a rear lens group including a lens unit having a positive refractive power and a lens unit having a negative refractive power. "Li" denotes an i-th lens unit, where i is the ordinal number of the lens unit from the object side. "LN" is a lens unit which is included in the rear lens group LR and has a negative refractive power, and "LP" is a lens unit which is included in the rear lens group LR and has a positive refractive power. "SP" denotes an aperture stop.

"GB" is an optical block such as a filter. "IP" is an image plane. When the zoom lens is used as an image pickup optical system for a digital camera, a video camera or a surveillance camera, the image plane IP corresponds to the image pickup surface of a solid-state image pickup element (photo-electric conversion element), such as a CCD or CMOS sensor. When the zoom lens is used as an image pickup optical system for a silver-halide film camera, the image plane IP corresponds to a film plane.

In the zoom lens of each embodiment, the distance between every adjacent two of the lens units changes during zooming. The arrows show the loci along which the lens units move during zooming from the wide-angle end to the telephoto end. The arrow for focusing shows the direction in which a lens unit moves in focusing from infinity to a close distance.

In the spherical aberration diagram, the solid line "d" denotes d-line (wavelength 587.6 nm) and the two-dot dash line "g" denotes g-line (wavelength 435.8 nm). In the astigmatism diagram, the dot line "M" denotes the meridional image plane of the d-line, and the solid line "S" denotes the sagittal image plane of the d-line. The distortion is shown using a d-line value. The lateral chromatic aberration is represented by g-line. In each aberration diagram, "ω" denotes a half angle of view for an image pickup (in degrees), and "Fno" denotes an f-number. In the embodiments, the wide-angle end and the telephoto end refer to zoom positions when disposed at ends of the range in which the lens units for zooming can move on an optical axis mechanically.

In Embodiments 1 to 4, the rear lens group LR includes, in order from the object side to the image side, a third lens unit L3 (LN) having a negative refractive power and a fourth lens unit L4 (LP) having a positive refractive power. In Embodiment 5, the rear lens group LR includes, in order from the object side to the image side, the third lens unit L3 (LN) having a negative refractive power, the fourth lens unit L4 (LP) having a positive refractive power, and a fifth lens unit L5 having a positive refractive power.

In each embodiment, the aperture stop SP is disposed on the object side of the second lens unit L2 and moves along the same locus as the second lens unit L2 during zooming. The aperture diameter of the aperture stop SP may be constant or variable during zooming.

With a variable aperture diameter, the aperture stop SP allows blocking of sagittal coma flare caused by off-axial rays occurring largely at the telephoto end, and thus enables better optical performance. The third lens unit L3 performs focusing by moving on the optical axis. To focus from infinity to a close distance at the telephoto end, the third lens unit L3 is retracted toward the image side as shown with the arrow 3c in the lens sectional diagrams.

The curve 3a in each lens sectional diagram shows a locus along which the third lens unit L3 at infinity focusing moves for correcting the image plane variation caused by zooming from the wide-angle end to the telephoto end. The curve 3b shows a locus along which the third lens unit L3 at close distance focusing moves for correcting the image plane variation caused by zooming from the wide-angle end to the telephoto end. Focusing may be performed by moving not the third lens unit L3, but all or some of the lenses in the second lens unit L2 or all or some of the lenses in the fourth lens unit L4 along the optical axis.

The zoom lenses of the present embodiments each include, in order from the object side to the image side, the first lens unit L1 having a negative refractive power, the second lens unit L2 having a positive refractive power, and the rear lens group LR having a positive refractive power overall. The rear lens group LR has at least one lens unit having a positive refractive power and at least one lens unit having a negative refractive power. The zoom lens has the aperture stop SP between the first lens unit L1 and the second lens unit L2.

The zoom lens of each embodiment satisfies the following conditional expressions:

$$1.1 < |M2|/f2 < 3.0, \text{ and} \quad (1)$$

$$0.15 < |Mp|/fp < 0.50 \quad (2)$$

where f2 is the focal length of the second lens unit L2, fp is the focal length of the lens unit LP, M2 is the amount by which the second lens unit L2 moves for zooming from the wide-angle end to the telephoto end, and Mp is the amount by which the lens unit LP moves for zooming from the wide-angle end to the telephoto end.

The amount by which a lens unit moves for zooming from the wide-angle end to the telephoto end is the difference between the on-axis position of the lens unit at the wide-angle end and the on-axis position of the lens unit at the telephoto end. The movement amount has a positive sign when the lens unit is located closer to the image side at the telephoto end than at the wide-angle end, and has a negative sign when the lens unit is located closer to the object side at the telephoto end than at the wide-angle end.

Typically, when a zoom lens including, in order from the object side to the image side, a lens unit having a negative refractive power, a lens unit having a positive refractive power, and a rear lens group including a plurality of lens units and having a positive refractive power overall is increased in its angle of view and zoom ratio, the effective diameter of the first lens unit increases. This causes the first lens unit to be heavier.

Thus, the zoom lenses of the present embodiments are each configured so that the first lens unit L1 does not move during zooming while the second lens unit L2 and the lens unit LP having a positive refractive power included in the rear lens group LR move during zooming. With such a configuration, the size of a motor necessary for zoom driving and the size of the lens barrel can be reduced. In order to reduce the overall size of the zoom lens while increasing variable magnification with the second lens unit L2 and the lens unit LP having a positive refractive power in the rear lens group moving during zooming, the refractive power of each lens unit needs to be strong.

On the other hand, to reduce aberrations for favorable optical performance, the number of lenses in each lens unit needs to be increased so that the refractive power may be shared in the lenses. However, the more lenses a lens unit has, the thicker the lens unit becomes. Thus, in the present embodiments, the refractive power and the moving stroke during zooming are appropriately set for each lens unit to appropriately share the variable magnification in the second lens unit L2 and the lens unit LP having a positive refractive power. Thereby, the zoom lenses of the present embodiments offer favorable optical performance with a high zoom ratio and a small overall size.

Further, by satisfying Conditional Expressions (1) and (2), a zoom lens can offer favorable optical performance over the entire zoom range with a small overall size, a wide angle of view, and a high zoom ratio.

Conditional Expression (1) defines the ratio of the amount by which the second lens unit L2 moves during zooming to the focal length of the second lens unit L2. By satisfying Conditional Expression (1), a zoom lens can offer favorable optical performance with a small overall size and a high zoom ratio. If the value of Conditional Expression (1) falls below its lower limit value because the focal length of the second lens unit L2 is too long, the variable magnification by the second lens unit L2 becomes small, which requires the second lens unit L2 to move a longer stroke to obtain a high zoom ratio. This causes the total lens length to be longer and is therefore unfavorable.

If, by contrast, the value of Conditional Expression (1) exceeds its upper limit value because the focal length of the second lens unit L2 is too short, spherical aberration and coma increase for the entire zoom range to such a degree that it is difficult to correct these aberrations, and this is unfavorable.

Conditional Expression (2) defines the ratio of the amount by which the lens unit LP included in the rear lens group LR moves during zooming to the focal length of the lens unit LP. By satisfying Conditional Expression (2), a zoom lens can offer favorable optical performance with a small overall size and a high zoom ratio. If the value of Conditional Expression (2) falls below its lower limit value because the focal length of the lens unit LP is too long, the variable magnification by the lens unit LP becomes small, which requires the lens unit LP to move a longer stroke to obtain a high zoom ratio. This causes the total lens length to be longer and is therefore unfavorable.

If, by contrast, the value of Conditional Expression (2) exceeds its upper limit value because the focal length of the lens unit LP is too short, field curvature and astigmatism increase for the entire zoom range to such a degree that it is difficult to correct these aberrations, and this is unfavorable.

In the embodiments as described above, the elements of the zoom lenses are appropriately set to satisfy Conditional Expressions (1) and (2). Thereby, a zoom lens that offers favorable optical performance with a small overall size, a wide angle of view, and a high zoom ratio is obtained.

Preferably, in the embodiments, the numerical values in Conditional Expressions (1) and (2) may be set as follows:

$$1.5 < |M2|/f2 < 2.8, \text{ and} \quad (1a)$$

$$0.17 < |Mp|/fp < 0.45 \quad (2a)$$

More preferably, the zoom lenses of the present embodiments may satisfy at least one of the following conditional expressions:

$$0.05 < D1/TL < 0.30, \quad (3)$$

$$1.0 < (\beta 2t/\beta 2w)/(\beta pt/\beta pw) < 5.0, \quad (4)$$

$$-4.0 < fn/fp < -0.5, \quad (5)$$

$$-1.2 < f1/f2 < -0.4, \quad (6)$$

$$1.96 < nd1p < 2.30, \quad (7)$$

$$10.0 < vd1p < 17.0, \text{ and} \quad (8)$$

$$-2.5 < f1/(fw \times \tan \omega q) < -0.5 \quad (9)$$

where D1 is the thickness of the first lens unit L1 on the optical axis, TL is the total lens length, $\beta 2w$ is the lateral magnification of the second lens unit L2 at the wide-angle end, $\beta 2t$ is the lateral magnification of the second lens unit L2 at the telephoto end, $\beta pw$ is the lateral magnification of the lens unit LP at the wide-angle end, $\beta pt$ is the lateral magnification of the lens unit LP at the telephoto end, fn is the focal length of the lens unit LN, and f1 is the focal length of the first lens unit L1. The first lens unit L1 has a positive lens, and nd1p and vd1p respectively represent the refractive index and the Abbe number of a material for the positive lens included in the first lens unit L1. Further, fw and ωw are the focal length and the half angle of view, respectively, of the zoom lens at the wide-angle end when the zoom lens is used in an image pickup apparatus having an image pickup element that receives light of an image formed by the zoom lens.

An abbe number vd of an optical material used in the embodiments is given by the following formula:

$$vd = (nd-1)/(nF - nC)$$

where nF, nd, and nC are the refractive indices for Fraunhofer's F-line (486.1 nm), Fraunhofer's d-line (587.6 nm), and Fraunhofer's C-line (656.3 nm), respectively.

Next, the technical meanings of the above-given conditional expressions are described. Conditional Expression (3) defines the thickness (lens-unit thickness) of the first lens unit L1 on the optical axis. A zoom lens satisfying Conditional Expression (3) achieves small overall size and favorable optical performance. If the value of Conditional Expression (3) falls below its lower limit value because the lens-unit thickness of the first lens unit L1 is too thin, the number of lenses has to be reduced, which causes increase in the field curvature particularly at the wide-angle end and is therefore unfavorable.

If, by contrast, the value of Conditional Expression (3) exceeds its upper limit value because the lens-unit thickness of the first lens unit L1 is too thick, the entrance height of off-axial rays passing through the lens surface in the first lens unit L1 closest to the object side becomes high at the zoom position toward the wide-angle end, which requires the effective diameter of the front lens to be larger and is therefore unfavorable.

Conditional Expression (4) defines the magnification ratios of the second lens unit L2 and the lens unit LP included in the rear lens group LR. A zoom lens satisfying Conditional Expression (4) offers favorable optical performance with a high zoom ratio. If the value of Conditional Expression (4) falls below its lower limit value because the magnification ratio of the lens unit LP included in the rear lens group LR is too large, the refractive power of the lens unit LP has to be strong so as not to increase the total lens length. This is unfavorable because variations in field curvature increase over the entire zoom range as a result.

If, by contrast, the value of Conditional Expression (4) exceeds its upper limit value because the magnification ratio of the second lens unit L2 is too large, the refractive power of the second lens unit L2 has to be strong so as not to increase the total lens length. This is unfavorable because variations in spherical aberration and coma increase over the entire zoom range as a result.

Conditional Expression (5) defines the ratio of the focal length of the lens unit LN included in the rear lens group LR to the focal length of the lens unit LP included in the rear lens group LR. A zoom lens satisfying Conditional Expression (5) offers favorable optical performance over the entire zoom range. If the value of Conditional Expression (5) falls below its lower limit value because the focal length of the lens unit LP is too short, it is unfavorable because variations in field curvature increase over the entire zoom range. If, by contrast, the value of Conditional Expression (5) exceeds its upper limit value because the focal length of the lens unit LN is too short, it is unfavorable because variations in spherical aberration increase over the entire zoom range.

Conditional Expression (6) defines the ratio of the focal length of the first lens unit L1 to the focal length of the second lens unit L2. A zoom lens satisfying Conditional Expression (6) offers favorable optical performance over the entire zoom range. If the value of Conditional Expression (6) falls below its lower limit value because the focal length of the second lens unit L2 is too short, spherical aberration and coma increase over the entire zoom range to such a degree that it is difficult to correct these aberrations. Thus, this is unfavorable. If, by contrast, the value of Conditional Expression (6) exceeds its upper limit value because the negative focal length of the first lens unit L1 is too short, field curvature increases at the wide-angle end, and this is unfavorable.

Conditional Expression (7) defines the refractive index of the material for the positive lens included in the first lens unit L1. A zoom lens satisfying Conditional Expression (7) offers favorable optical performance with a small overall size. If the refractive index of the material for the positive lens is so low as to fall below the lower limit value of Conditional Expression (7), the lens-unit thickness of the first lens unit L1 becomes too thick. This increases the total lens length and is therefore unfavorable. If, by contrast, the refractive index of the material for the positive lens in the first lens unit L1 is so high as to exceed the upper limit value of Conditional Expression (7), the Petzval sum decreases to such a degree that it is difficult to correct field curvature and astigmatism. Thus, this is unfavorable.

Conditional Expression (8) defines the Abbe number of the material for the positive lens included in the first lens unit L1. A zoom lens satisfying Conditional Expression (8) offers favorable optical performance with a small overall size. If the Abbe number of the material for the positive lens in the first lens unit L1 is so small as to fall below the lower limit value of Conditional Expression (8), lateral chromatic aberration is overcorrected at the wide-angle end. Thus, this is unfavorable.

If, by contrast, the Abbe number of the material for the positive lens in the first lens unit L1 is so large as to exceed the upper limit value of Conditional Expression (8), the positive lens has to be increased in its positive refractive power so as to be able to correct lateral chromatic aberration at the wide-angle end, and consequently, the thickness of the positive lens increases. This causes the total lens length to be longer, and is therefore unfavorable.

Conditional Expression (9) defines the focal length of the first lens unit L1. A zoom lens satisfying Conditional Expression (9) offers favorable optical performance with a small overall size and a wide angle of view. If the value of Conditional Expression (9) falls below its lower limit because the negative focal length of the first lens unit L1 is too long (or too large in absolute value), the first lens unit L1 has to be increased in size if an angle of view is to be increased. This is unfavorable.

If, by contrast, the value of Conditional Expression (9) exceeds its upper limit because the negative focal length of the first lens unit L1 is too short (or too small in absolute value), field curvature increases at the wide-angle end. This is unfavorable.

Preferably, in the embodiments, the numerical values in Conditional Expressions (3) to (9) may be set as follows:

$$0.10 < D1/TL < 0.25, \quad (3a)$$

$$1.1 < (\beta 2t/\beta 2w)/(\beta pt/\beta pw) < 4.0, \quad (4a)$$

$$-2.5 < fn/fp < -1.2, \quad (5a)$$

$$-1.0 < f1/f2 < -0.6, \quad (6a)$$

$$1.98 < nd1p < 2.10, \quad (7a)$$

$$12.0 < vd1p < 16.6, \text{ and} \quad (8a)$$

$$-2.3 < f1/(fw \times \tan \omega q) < -0.9 \quad (9a)$$

In the embodiments, by configuring the elements of the zoom lenses as above, the zoom lenses offer high optical performance over the entire zoom range with a small overall size, a wide angle of view, and a high zoom ratio. The advantageous effects of the present invention can be enhanced when any of the conditional expressions given above are combined.

It is still more preferable when the zoom lenses of the embodiments are configured as follows:

The lens unit LN included in the rear lens group LR moves along a locus convex to the object side during zooming from the wide-angle end to the telephoto end.

The lens unit LN included in the rear lens group LR has a positive lens and a negative lens.

The lens unit LP included in the rear lens group LR has a positive lens and a negative lens.

Next, the lens configurations of the lens units in each embodiment are described. In the following lens configurations of the lens units, lenses are arranged in order from the object side to the image side unless otherwise specified.

Embodiment 1

The first lens unit L1 includes a negative meniscus lens having a convex surface facing to the object side, a negative biconcave lens, and a positive meniscus lens having a convex surface facing to the object side. The use of the two negative lenses suppresses the occurrence of field curvature and distortion, which tend to be caused when an angle of view is widened. The second lens unit L2 includes a positive biconvex lens being aspheric on both surfaces, a cemented lens constituted by a positive biconvex lens and a negative biconcave lens cemented to each other, and a positive biconvex lens. Such a lens configuration suppresses the occurrence of spherical aberration and coma over the entire zoom range while achieving a high zoom ratio.

The third lens unit L3 (LN) includes a negative biconcave lens being aspheric on both surfaces and a positive meniscus lens having a concave surface facing to the object side. Such a lens configuration suppresses the occurrence of spherical aberration in the intermediate zoom range while achieving a high zoom ratio. The fourth lens unit L4 (LP) includes a positive biconvex lens and a cemented lens constituted by a positive biconvex lens and a negative biconcave lens cemented to each other. Such a lens configuration suppresses the occurrence of field curvature over the entire zoom range while achieving a high zoom ratio.

Embodiment 2

The zoom lens of Embodiment 2 has the same lens configurations as that of Embodiment 1 with regard to the first lens unit L1, the third lens unit L3, and the fourth lens unit L4. Having the same lens configuration means that the number of lenses included in a lens unit and their lens shapes are the same. The second lens unit L2 includes a positive biconvex lens being aspheric on both surfaces, a cemented lens constituted by a positive meniscus lens having a convex surface facing to the object side and a negative meniscus lens having a convex surface facing to the object side cemented to each other, and a positive meniscus lens having a concave surface facing to the object side.

Embodiment 3

The first lens unit L1 includes two negative meniscus lenses each having a convex surface facing to the object side, a negative biconcave lens, and a positive meniscus lens having a convex surface facing to the object side. The use of the three negative lenses suppresses the occurrence of field curvature and distortion while achieving a wide angle of view. The second lens unit L2 includes a positive biconvex lens being aspheric on both surfaces, a cemented lens constituted by a positive biconvex lens and a negative biconcave lens cemented to each other, and a positive biconvex lens. Such a lens configuration suppresses the occurrence of spherical aberration and coma over the entire zoom range while achieving a high zoom ratio.

The third lens unit L3 includes a negative biconcave lens being aspheric on both surfaces and a positive meniscus lens having a concave surface facing to the object side. Such a lens configuration suppresses the occurrence of spherical aberration in the intermediate zoom range while achieving a high zoom ratio. The fourth lens unit L4 includes a positive meniscus lens having a convex surface facing to the object side and a cemented lens constituted by a positive biconvex lens and a negative meniscus lens having a concave surface facing to the image side cemented to each other. Such a lens configuration suppresses the occurrence of field curvature over the entire zoom range while achieving a high zoom ratio.

Embodiment 4

The zoom lens of Embodiment 4 has the same lens configurations as that of Embodiment 3 with regard to the first lens unit L1, the second lens unit L2, and the third lens unit L3. The fourth lens unit L4 includes a positive biconvex lens and a cemented lens constituted by a positive biconvex lens and a negative meniscus lens having a concave surface facing to the image side cemented to each other.

Embodiment 5

The first lens unit L1 includes two negative meniscus lenses each having a convex surface facing to the object side, a negative biconcave lens, and a positive meniscus lens having a convex surface facing to the object side. The use of the three negative lenses suppresses the occurrence of field curvature and distortion while achieving a wide angle of view. The second lens unit L2 includes a positive biconvex lens being aspheric on both surfaces, a cemented lens constituted by a positive biconvex lens and a negative biconcave lens cemented to each other, and a positive biconvex lens. Such a lens configuration suppresses the occurrence of spherical aberration and coma over the entire zoom range while achieving a high zoom ratio.

The third lens unit L3 (LN) includes a negative biconcave lens being aspheric on both surfaces and a positive meniscus lens having a concave surface facing to the object side. Such a lens configuration suppresses the occurrence of spherical aberration in the intermediate zoom range while achieving a high zoom ratio. The fourth lens unit L4 (LP) includes a cemented lens constituted by a positive biconvex lens and a negative meniscus lens having a concave surface facing to the image side cemented to each other. The fifth lens unit L5 includes a cemented lens constituted by a positive meniscus lens having a convex surface facing to the object side and a negative meniscus lens having a convex surface facing to the object side cemented to each other.

Next, using FIG. 11, a description is given of an embodiment of an image pickup apparatus (a surveillance camera) for which any of the zoom lenses of the present embodiments is used as an image pickup optical system. In FIG. 11, "10" denotes a surveillance camera main body, and "11" denotes an image pickup optical system including any of the zoom lenses described in Embodiments 1 to 5. Further, "12" denotes an image pickup element (a photo-electric conversion element), such as a CCD or CMOS sensor, incorporated in the camera main body 10 to receive light of a subject image formed by the image pickup optical system 11.

Further, "13" denotes a memory that records information representing the subject image photoelectrically converted by the image pickup element 12, and "14" is a network cable used to transfer the subject image photoelectrically-converted by the image pickup element 12. An image pickup apparatus for which the zoom lens of each embodiment is used is not limited to a surveillance camera, but can also be a video camera, a digital camera, or the like.

The image pickup apparatus of this embodiment may have, along with any of the above-described zoom lenses, a circuit (correction means) for electrically correcting distortion and/or lateral chromatic aberration. With such a configuration permitting distortion and other aberrations of a zoom lens, the zoom lens is allowed to have fewer lenses overall, which facilitates reduction in its overall size. Also, electrical correction of lateral chromatic aberration reduces color fringing in a captured image, facilitating improvement in the resolution.

An image pickup system (a surveillance camera system) including any of the zoom lenses of the present embodiments and a controller that controls the zoom lens may also be constructed. In this case, as described above, during zooming, the first lens unit does not move, the second lens unit moves to be closer to the object side at the telephoto end than at the wide-angle end, and the lens unit LP moves to be closer to the image side at the telephoto end than at the wide-angle end. The controller controls the zoom lens so that the distance between every adjacent two of the lens units changes during zooming. Also, the controller controls the zoom lens so that the zoom lens satisfies Conditional Expressions (1) and (2) described above. The controller does not need to be integral with the zoom lens. For example, a configuration for remote control of the zoom lens may be adopted, in which the controller in the remotely arranged control apparatus sends commands (signals) to the driver that drives the lenses of the zoom lens.

The preferred embodiments of the present invention have been described above, but the present invention is not limited to those embodiments, and may be variously modified or changed without departing the gist thereof.

Next, Numerical Value Embodiments 1 to 5 corresponding respectively to Embodiments 1 to 5 of the present invention are presented. In each numerical value Embodiments, "i" represents the ordinal number of an optical surface from the object side.

Further, "ri" represents the radius of curvature of the i-th optical surface (or simply the i-th surface), "di" represents the distance between the i-th surface and the (i+1)-th surface, and ndi and vdi respectively represent the refractive index and the Abbe number, for d-line, of a material for an optical member between the i-th surface and the (i+1)-th surface. The last two optical surfaces on the image side are those of a glass member such as a face plate. A back focus (BF) represents an air-equivalent distance from the rearmost lens surface to a paraxial image plane. The total lens length is a total distance of the back focus (BF) and the distance from the frontmost lens surface to the rearmost lens surface.

The surface numbers denoting aspheric surfaces are asterisked. In addition, with "k" representing an eccentricity, "A4", "A6", "A8", and "A10" representing aspherical coefficients, and "x" representing a displacement from the surface vertex along the optical axis at a height h from the optical axis, an aspherical shape is expressed as follows:

$$x = (h^2/R)/[1+\{1-(1+k)(h/R)^2\}^{1/2}] + A4h^4 + A6h^6 + A8h^8 + A10h^{10}$$

where R represents the paraxial radius of curvature. Further, "e-z" indicates "$10^{-z}$". Table 1 shows correspondences between the above-given conditional expressions and Numerical Value Embodiments 1 to 5.

Numerical Value Embodiment 1

[unit: mm]

Surface data

| Surface number | r | d | nd | vd |
|---|---|---|---|---|
| 1 | 51.434 | 1.20 | 1.88300 | 40.8 |
| 2 | 13.542 | 9.27 | | |
| 3 | −44.698 | 1.00 | 1.60311 | 60.6 |
| 4 | 42.109 | 0.12 | | |
| 5 | 30.338 | 2.00 | 1.99692 | 16.4 |
| 6 | 66.274 | (variable) | | |
| 7(stop) | ∞ | 1.00 | | |
| 8* | 19.744 | 3.90 | 1.88202 | 37.2 |
| 9* | −75.673 | 1.00 | | |
| 10 | 28.119 | 2.01 | 1.49700 | 81.5 |
| 11 | −87.275 | 0.50 | 1.84666 | 23.9 |
| 12 | 16.220 | 3.11 | | |
| 13 | 70.265 | 2.57 | 1.49700 | 81.5 |
| 14 | −19.671 | (variable) | | |
| 15* | −18.207 | 0.50 | 1.58313 | 59.4 |
| 16* | 99.092 | 2.11 | | |
| 17 | −11.602 | 2.09 | 1.80400 | 46.6 |
| 18 | −10.168 | (variable) | | |
| 19 | 20.457 | 3.26 | 1.69680 | 55.5 |
| 20 | −85.827 | 0.11 | | |
| 21 | 79.112 | 2.44 | 1.77250 | 49.6 |
| 22 | −32.714 | 0.55 | 1.85478 | 24.8 |
| 23 | 57.786 | (variable) | | |
| 24 | ∞ | 1.75 | 1.51633 | 64.1 |
| 25 | ∞ | 0.40 | | |
| Image plane | ∞ | | | |

Aspheric surface data

8th surface

K = −9.71302e−001
A4 = 6.17761e−006
A6 = −1.42168e−008
A8 = 6.38210e−010
A10 = 1.67515e−012

9th surface

K = 0.00000e+000
A4 = 2.36818e−005
A6 = −5.38427e−008
A8 = 9.11041e−010

15th surface

K = 0.00000e+000
A4 = −2.02138e−004
A6 = 2.98417e−006
A8 = −5.11932e−008

16th surface

K = 1.94576e+002
A4 = −1.42104e−004
A6 = 3.03111e−006
A8 = −5.45697e−008

Various data
Zoom ratio 5.89

| | Wide angle | Intermediate | Telephoto |
|---|---|---|---|
| Focal length | 5.74 | 11.63 | 33.80 |
| F-number | 1.65 | 2.56 | 4.12 |
| Half angle of view (deg) | 58.8 | 27.1 | 9.16 |
| Image height | 5.50 | 5.50 | 5.50 |

-continued

[unit: mm]

| | | | |
|---|---|---|---|
| Total lens length | 94.73 | 94.73 | 94.73 |
| BF | 10.58 | 5.23 | 5.25 |
| d6 | 40.65 | 25.54 | 2.88 |
| d14 | 2.84 | 7.42 | 37.87 |
| d18 | 1.92 | 17.81 | 9.99 |
| d23 | 9.03 | 3.67 | 3.70 |

Zoom lens unit data

| Unit | Start surface | Focal length |
|---|---|---|
| 1 | 1 | −16.17 |
| 2 | 7 | 20.72 |
| 3 | 15 | −59.13 |
| 4 | 19 | 27.73 |

Numerical Value Embodiment 2

[unit: mm]

Surface data

| Surface number | r | d | nd | vd |
|---|---|---|---|---|
| 1 | 83.053 | 1.20 | 1.77250 | 49.6 |
| 2 | 16.310 | 11.43 | | |
| 3 | −46.834 | 1.00 | 1.59522 | 67.7 |
| 4 | 133.274 | 0.12 | | |
| 5 | 32.043 | 1.89 | 1.99692 | 16.4 |
| 6 | 48.251 | (variable) | | |
| 7(stop) | ∞ | 1.00 | | |
| 8* | 15.785 | 3.45 | 1.80610 | 40.7 |
| 9* | −84.917 | 0.36 | | |
| 10 | 18.372 | 1.83 | 1.49700 | 81.5 |
| 11 | 88.817 | 0.50 | 1.85478 | 24.8 |
| 12 | 12.308 | 2.72 | | |
| 13 | −41.652 | 1.65 | 1.43875 | 94.9 |
| 14 | −16.447 | (variable) | | |
| 15* | −28.810 | 0.50 | 1.58313 | 59.4 |
| 16* | 24.957 | 2.32 | | |
| 17 | −8.515 | 2.01 | 1.88300 | 40.8 |
| 18 | −9.000 | (variable) | | |
| 19 | 21.200 | 3.52 | 1.59522 | 67.7 |
| 20 | −119.656 | 0.42 | | |
| 21 | 20.121 | 3.38 | 1.77250 | 49.6 |
| 22 | −97.773 | 0.55 | 1.95906 | 17.5 |
| 23 | 66.677 | (variable) | | |
| 24 | ∞ | 1.75 | 1.51633 | 64.1 |
| 25 | ∞ | 0.40 | | |
| Image plane | ∞ | | | |

Aspheric surface data

8th surface

K = −8.36737e−001
A4 = 1.15443e−005
A6 = 4.49518e−008
A8 = −5.69000e−011
A10 = 1.22290e−012

9th surface

K = 0.00000e+000
A4 = 4.15633e−005
A6 = −6.09594e−008
A8 = −5.77203e−012

15th surface

K = 0.00000e+000
A4 = −1.51065e−004

-continued

[unit: mm]

A6 = 1.86197e−006
A8 = −3.61048e−008
16th surface

K = 1.48515e−001
A4 = −1.11873e−004
A6 = 1.81963e−006
A8 = −2.50833e−008

Various data
Zoom ratio 7.39

|  | Wide angle | Intermediate | Telephoto |
| --- | --- | --- | --- |
| Focal length | 5.92 | 13.90 | 43.77 |
| F-number | 1.64 | 2.95 | 5.35 |
| Half angle of view (deg) | 59.6 | 22.2 | 6.93 |
| Image height | 5.50 | 5.50 | 5.50 |
| Total lens length | 103.89 | 103.89 | 103.89 |
| BF | 11.44 | 5.80 | 5.15 |
| d6 | 47.98 | 30.32 | 3.84 |
| d14 | 2.70 | 12.61 | 39.26 |
| d18 | 1.93 | 15.31 | 15.78 |
| d23 | 9.88 | 4.25 | 3.60 |

Zoom lens unit data

| Unit | Start surface | Focal length |
| --- | --- | --- |
| 1 | 1 | −21.10 |
| 2 | 7 | 22.73 |
| 3 | 15 | −30.02 |
| 4 | 19 | 18.00 |

Numerical Value Embodiment 3

[unit: mm]

Surface data

| Surface number | r | d | nd | vd |
| --- | --- | --- | --- | --- |
| 1 | 30.070 | 1.90 | 1.91082 | 35.3 |
| 2 | 18.850 | 7.76 |  |  |
| 3 | 40.829 | 1.20 | 1.77250 | 49.6 |
| 4 | 14.396 | 10.26 |  |  |
| 5 | −43.669 | 1.00 | 1.59522 | 67.7 |
| 6 | 46.375 | 0.11 |  |  |
| 7 | 29.530 | 2.16 | 1.99692 | 16.4 |
| 8 | 52.638 | (variable) |  |  |
| 9(stop) | ∞ | 1.00 |  |  |
| 10* | 21.027 | 3.93 | 1.88202 | 37.2 |
| 11* | −72.219 | 1.74 |  |  |
| 12 | 32.095 | 1.94 | 1.59522 | 67.7 |
| 13 | −92.409 | 0.50 | 1.85478 | 24.8 |
| 14 | 15.628 | 1.18 |  |  |
| 15 | 24.058 | 3.25 | 1.49700 | 81.5 |
| 16 | −20.558 | (variable) |  |  |
| 17* | −15.753 | 0.50 | 1.69350 | 53.2 |
| 18* | 22.352 | 4.25 |  |  |
| 19 | −29.079 | 2.54 | 1.69680 | 55.5 |
| 20 | −13.891 | (variable) |  |  |
| 21 | 18.294 | 3.86 | 1.59522 | 67.7 |
| 22 | 568.155 | 0.11 |  |  |
| 23 | 51.026 | 3.84 | 1.59522 | 67.7 |
| 24 | −23.614 | 0.55 | 1.84666 | 23.9 |
| 25 | −72.348 | (variable) |  |  |

-continued

[unit: mm]

| 26 | ∞ | 1.75 | 1.51633 | 64.1 |
| --- | --- | --- | --- | --- |
| 27 | ∞ | 0.40 |  |  |
| Image plane | ∞ |  |  |  |

Aspheric surface data

10th surface

K = −8.17693e−001
A4 = 9.93822e−006
A6 = −1.05638e−007
A8 = 2.47774e−009
A10 = −1.65865e−012
11th surface K = 0.00000e+000
A4 = 3.43433e−005
A6 = −1.23121e−007
A8 = 2.38719e−009
17th surface K = 0.00000e+000
A4 = −4.60533e−005
A6 = 2.55474e−006
A8 = −3.99155e−008
18th surface K = 1.38096e+000
A4 = −8.97568e−005
A6 = 1.90093e−006
A8 = −3.42449e−008

Various data
Zoom ratio 7.89

|  | Wide angle | Intermediate | Telephoto |
| --- | --- | --- | --- |
| Focal length | 4.53 | 10.06 | 35.72 |
| F-number | 1.65 | 2.75 | 5.00 |
| Half angle of view (deg) | 67.6 | 30.5 | 8.59 |
| Image height | 5.50 | 5.50 | 5.50 |
| Total lens length | 116.11 | 116.11 | 116.11 |
| BF | 9.51 | 4.69 | 4.68 |
| d8 | 48.38 | 30.33 | 3.27 |
| d16 | 2.88 | 5.40 | 21.63 |
| d20 | 1.76 | 22.10 | 32.95 |
| d25 | 7.96 | 3.13 | 3.13 |

Zoom lens unit data

| Unit | Start surface | Focal length |
| --- | --- | --- |
| 1 | 1 | −13.43 |
| 2 | 9 | 18.00 |
| 3 | 17 | −30.83 |
| 4 | 21 | 23.24 |

Numerical Value Embodiment 4

[unit: mm]

Surface data

| Surface number | r | d | nd | vd |
| --- | --- | --- | --- | --- |
| 1 | 43.384 | 1.90 | 1.91082 | 35.3 |
| 2 | 21.286 | 7.07 |  |  |
| 3 | 52.090 | 1.30 | 1.59522 | 67.7 |
| 4 | 15.001 | 10.71 |  |  |

-continued

[unit: mm]

| | | | | |
|---|---|---|---|---|
| 5 | −46.673 | 1.00 | 1.59522 | 67.7 |
| 6 | 47.874 | 0.12 | | |
| 7 | 32.453 | 2.11 | 1.99692 | 16.4 |
| 8 | 65.239 | (variable) | | |
| 9(stop) | ∞ | 1.00 | | |
| 10* | 22.569 | 3.82 | 1.88202 | 37.2 |
| 11* | −87.741 | 2.14 | | |
| 12 | 29.118 | 2.03 | 1.49700 | 81.5 |
| 13 | −105.176 | 0.60 | 1.84666 | 23.9 |
| 14 | 16.837 | 0.74 | | |
| 15 | 27.460 | 3.10 | 1.49700 | 81.5 |
| 16 | −22.933 | (variable) | | |
| 17* | −16.580 | 0.50 | 1.58313 | 59.4 |
| 18* | 24.438 | 5.30 | | |
| 19 | −26.969 | 2.53 | 1.77250 | 49.6 |
| 20 | −15.267 | (variable) | | |
| 21 | 18.113 | 4.34 | 1.59522 | 67.7 |
| 22 | −567.696 | 0.11 | | |
| 23 | 52.031 | 3.56 | 1.59522 | 67.7 |
| 24 | −28.137 | 0.70 | 1.85478 | 24.8 |
| 25 | −173.795 | (variable) | | |
| 26 | ∞ | 1.75 | 1.51633 | 64.1 |
| 27 | ∞ | 0.40 | | |
| Image plane | ∞ | | | |

Aspheric surface data

10th surface

K = −8.25793e−001
A4 = 9.12188e−006
A6 = −9.38055e−008
A8 = 1.88023e−009
A10 = −1.23658e−012

11th surface

K = 0.00000e+000
A4 = 2.41460e−005
A6 = −1.07060e−007
A8 = 1.82908e−009

17th surface

K = 0.00000e+000
A4 = −5.13752e−005
A6 = 2.11295e−006
A8 = −3.19932e−008

18th surface

K = 9.82383e+000
A4 = −1.42999e−004
A6 = 1.16850e−006
A8 = −5.19165e−008

Various data
Zoom ratio 7.89

| | Wide angle | Intermediate | Telephoto |
|---|---|---|---|
| Focal length | 4.59 | 10.16 | 36.20 |
| F-number | 1.65 | 2.73 | 5.00 |
| Half angle of view (deg) | 69.4 | 30.4 | 8.46 |
| Image height | 5.50 | 5.50 | 5.50 |
| Total lens length | 119.43 | 119.43 | 119.43 |
| BF | 9.68 | 4.70 | 4.69 |
| d8 | 50.36 | 31.48 | 3.16 |
| d16 | 2.92 | 6.08 | 28.77 |
| d20 | 1.79 | 22.49 | 28.12 |
| d25 | 8.13 | 3.14 | 3.14 |

-continued

[unit: mm]

Zoom lens unit data

| Unit | Start surface | Focal length |
|---|---|---|
| 1 | 1 | −14.30 |
| 2 | 9 | 20.00 |
| 3 | 17 | −43.17 |
| 4 | 21 | 24.61 |

Numerical Value Embodiment 5

[unit: mm]

Surface data

| Surface number | r | d | nd | vd |
|---|---|---|---|---|
| 1 | 52.718 | 1.90 | 1.85150 | 40.8 |
| 2 | 21.083 | 5.13 | | |
| 3 | 37.849 | 1.30 | 1.59522 | 67.7 |
| 4 | 14.759 | 10.71 | | |
| 5 | −41.995 | 1.00 | 1.59522 | 67.7 |
| 6 | 45.061 | 0.11 | | |
| 7 | 31.431 | 2.04 | 1.99692 | 16.4 |
| 8 | 60.008 | (variable) | | |
| 9(stop) | ∞ | 1.00 | | |
| 10* | 24.806 | 3.18 | 1.85135 | 40.1 |
| 11* | −61.991 | 2.84 | | |
| 12 | 31.410 | 1.91 | 1.49700 | 81.5 |
| 13 | −120.951 | 0.60 | 1.84666 | 23.9 |
| 14 | 19.070 | 0.76 | | |
| 15 | 35.194 | 2.98 | 1.49700 | 81.5 |
| 16 | −22.120 | (variable) | | |
| 17* | −13.933 | 0.50 | 1.58313 | 59.4 |
| 18* | 25.348 | 4.44 | | |
| 19 | −33.483 | 2.67 | 1.77250 | 49.6 |
| 20 | −15.321 | (variable) | | |
| 21 | 22.455 | 4.12 | 1.59522 | 67.7 |
| 22 | −56.353 | 0.70 | 1.95906 | 17.5 |
| 23 | −110.700 | (variable) | | |
| 24 | 21.539 | 2.34 | 1.59522 | 67.7 |
| 25 | 1295.953 | 0.70 | 1.85478 | 24.8 |
| 26 | 79.195 | 2.92 | | |
| 27 | ∞ | 1.75 | 1.51633 | 64.1 |
| 28 | ∞ | 0.40 | | |
| Image plane | ∞ | | | |

Aspheric surface data

10th surface

K = −5.49341e−001
A4 = 1.58381e−006
A6 = −1.47529e−007
A8 = 2.00861e−009
A10 = −1.58994e−012

11th surface

K = 0.00000e+000
A4 = 2.11840e−005
A6 = −1.47753e−007
A8 = 1.79753e−009

17th surface

K = 0.00000e+000
A4 = 3.29430e−005
A6 = −3.13342e−008
A8 = 5.11827e−011

-continued

[unit: mm]

18th surface

K = 8.98054e+000
A4 = −7.24809e−005
A6 = −8.37788e−007
A8 = −1.15795e−008

Various data
Zoom ratio 7.89

| | Wide angle | Intermediate | Telephoto |
|---|---|---|---|
| Focal length | 4.63 | 9.78 | 36.54 |
| F-number | 1.65 | 2.60 | 5.00 |
| Half angle of view (deg) | 69.2 | 31.5 | 8.28 |
| Image height | 5.50 | 5.50 | 5.50 |
| Total lens length | 119.57 | 119.57 | 119.57 |
| BF | 4.47 | 4.47 | 4.47 |
| d8 | 51.40 | 32.12 | 3.21 |
| d16 | 3.03 | 5.70 | 31.67 |
| d20 | 1.78 | 24.86 | 27.80 |
| d23 | 7.98 | 1.49 | 1.50 |

Zoom lens unit data

| Unit | Start surface | Focal length |
|---|---|---|
| 1 | 1 | −13.94 |
| 2 | 9 | 20.00 |
| 3 | 17 | −44.80 |
| 4 | 21 | 35.09 |
| 5 | 24 | 56.87 |

TABLE 1

| | Embodiment 1 | Embodiment 2 | Embodiment 3 | Embodiment 4 | Embodiment 5 |
|---|---|---|---|---|---|
| Conditional Expression (1) | 1.82 | 1.93 | 2.51 | 2.36 | 2.40 |
| Conditional Expression (2) | 0.194 | 0.353 | 0.210 | 0.202 | 0.184 |
| Conditional Expression (3) | 0.142 | 0.150 | 0.209 | 0.199 | 0.184 |
| Conditional Expression (4) | 3.25 | 1.25 | 3.00 | 3.36 | 3.97 |
| Conditional Expression (5) | −2.13 | −1.70 | −1.33 | −1.82 | −1.29 |
| Conditional Expression (6) | −0.78 | −0.93 | −0.75 | −0.71 | −0.69 |
| Conditional Expression (7) | 1.99692 | 1.99692 | 1.99692 | 1.99692 | 1.99692 |
| Conditional Expression (8) | 16.40 | 16.40 | 16.40 | 16.40 | 16.40 |
| Conditional Expression (9) | −1.70 | −2.10 | −1.22 | −1.16 | −1.14 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-216986, filed Nov. 7, 2016, which is hereby incorporated by reference herein in its entirety.

What is claimed is:

1. A zoom lens comprising, in order from an object side to an image side:
    a first lens unit having a negative refractive power, an aperture stop, a second lens unit having a positive refractive power, and a rear lens group having a positive refractive power, wherein
    the first lens unit includes a positive lens,
    the rear lens group includes a lens unit LN having a negative refractive power and a lens unit LP having a positive refractive power,
    during zooming, the first lens unit does not move, the second lens unit moves so as to be closer to the object side at a telephoto end than at a wide-angle end, the lens unit LP moves so as to be closer to the image side at the telephoto end than at the wide-angle end, and an interval between every adjacent two of the lens units changes, and
    the following conditional expressions are satisfied:

$1.1 < |M2|/f2 < 3.0,$ $0.15 < |Mp|/fp < 0.50,$ $1.96 < nd1p < 2.30,$ and $10.0 < vd1p < 17.0,$ where f2 is a focal length of the second lens unit, fp is a focal length of the lens unit LP, M2 is an amount by which the second lens unit moves for zooming from the wide-angle end to the telephoto end, Mp is an amount by which the lens unit LP moves for zooming from the wide-angle end to the telephoto end, and nd1p and vd1p represent a refractive index and an Abbe number, respectively, of a material for the positive lens in the first lens unit.

2. The zoom lens according to claim 1, wherein the following conditional expression is satisfied:

$0.05 < D1/TL < 0.30,$ where D1 is a thickness of the first lens unit on an optical axis, and TL is an total lens length.

3. The zoom lens according to claim 1, wherein the following conditional expression is satisfied:

$1.0 < (\beta 2t/\beta 2w)/(\beta pt/\beta pw) < 5.0,$ where ß2w is a lateral magnification of the second lens unit at the wide-angle end, ß2t is a lateral magnification of the second lens unit at the telephoto end, ßpw is a lateral magnification of the lens unit LP at the wide-angle end, and ßpt is a lateral magnification of the lens unit LP at the telephoto end.

4. The zoom lens according to claim 1, wherein the following conditional expression is satisfied:

$-4.0 < fn/fp < -0.5,$ where fn is a focal length of the lens unit LN.

5. The zoom lens according to claim 1, wherein the following conditional expression is satisfied:

$-1.2 < f1/f2 < -0.4,$ where f1 is a focal length of the first lens unit.

6. The zoom lens according to claim 1, wherein during zooming from the wide-angle end to the telephoto end, the lens unit LN moves first to the object side and then to the image side.

7. The zoom lens according to claim 1, wherein the lens unit LN includes a positive lens and a negative lens.

8. The zoom lens according to claim 1, wherein the lens unit LP includes a positive lens and a negative lens.

9. The zoom lens according to claim 1, wherein the rear lens group includes, in order from the object side to the image side, a third lens unit having a negative refractive power and a fourth lens unit having a positive refractive power.

10. The zoom lens according to claim 1, wherein the rear lens group includes, in order from the object side to the image side, a third lens unit having a negative refractive power, a fourth lens unit having a positive refractive power, and a fifth lens unit having a positive refractive power.

11. An image pickup apparatus comprising:
the zoom lens according to claim 1; and
an image pickup element that receives light from the zoom lens.

12. The image pickup apparatus according to claim 11, wherein the following conditional expression is satisfied:

$$-2.5 < f1/(fw \times \tan \omega w) < -0.5,$$

where f1 is a focal length of the first lens unit, fw is a focal length of the zoom lens at the wide-angle end, and ωw is a half angle of view at the wide-angle end.

13. An image pickup system comprising:
the image pickup apparatus according to claim 11; and
a controller that controls the zoom lens,
wherein the controller controls the zoom lens so that, during zooming, the first lens unit does not move, the second lens unit moves so as to be closer to the object side at a telephoto end than at a wide-angle end, the lens unit LP moves so as to be closer to the image side at the telephoto end than at the wide-angle end, and an interval between every adjacent two of the lens units changes.

14. A control apparatus for controlling the zoom lens according to claim 1, comprising a controller that controls the zoom lens so that, during zooming, the first lens unit does not move, the second lens unit moves so as to be closer to the object side at a telephoto end than at a wide-angle end, the lens unit LP moves so as to be closer to the image side at the telephoto end than at the wide-angle end, and an interval between every adjacent two of the lens units changes.

15. An image pickup apparatus comprising:
a zoom lens; and
an image pickup element that receives light from the zoom lens, wherein
the zoom lens includes, in order from an object side to an image side, a first lens unit having a negative refractive power, an aperture stop, a second lens unit having a positive refractive power, and a rear lens group having a positive refractive power,
the rear lens group includes a lens unit LN having a negative refractive power and a lens unit LP having a positive refractive power,
during zooming, the first lens unit does not move, the second lens unit moves so as to be closer to the object side at a telephoto end than at a wide-angle end, the lens unit LP moves so as to be closer to the image side at the telephoto end than at the wide-angle end, and an interval between every adjacent two of the lens units changes, and
the following conditional expressions are satisfied:

$$1.1 < |M2|/f2 < 3.0,$$

$$0.15 < |Mp|/fp < 0.50, \text{ and}$$

$$-2.5 < f1/(fw \times \tan \omega w) < -0.5,$$

where f2 is a focal length of the second lens unit, fp is a focal length of the lens unit LP, M2 is an amount by which the second lens unit moves for zooming from the wide-angle end to the telephoto end, Mp is an amount by which the lens unit LP moves for zooming from the wide-angle end to the telephoto end, f1 is a focal length of the first lens unit, fw is a focal length of the zoom lens at the wide-angle end, and ωw is a half angle of view at the wide-angle end.

* * * * *